(12) United States Patent
Higuchi

(10) Patent No.: US 6,618,079 B1
(45) Date of Patent: Sep. 9, 2003

(54) COLOR CONNECTING APPARATUS FOR A VIDEO CAMERA

(75) Inventor: Hiroshi Higuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/047,965

(22) Filed: Mar. 25, 1998

(30) Foreign Application Priority Data

Apr. 1, 1997 (JP) ............................................. 9-083079

(51) Int. Cl.$^7$ ......................... H04N 9/73; H04N 5/228; H04N 9/64; G06K 9/00
(52) U.S. Cl. ........................... 348/223.1; 348/222.1; 348/650; 382/167; 382/162
(58) Field of Search ............................... 348/272, 225, 348/223, 645, 649, 650, 222, 222.1, 223.1, 225.1; 382/167, 162; 358/518, 519, 520

(56) References Cited

U.S. PATENT DOCUMENTS

| | | | |
|---|---|---|---|
| 4,414,573 A | * 11/1983 | Griesshaber et al. | 358/163 |
| 4,608,593 A | * 8/1986 | Miyaji et al. | 358/10 |
| 4,907,071 A | * 3/1990 | Belmares-Sarabia et al. | 348/586 |
| 5,260,774 A | * 11/1993 | Takayama | 358/29 |
| 5,508,742 A | * 4/1996 | Geerlings et al. | 348/272 |
| 5,552,904 A | * 9/1996 | Ryoo | 358/18 |
| 5,568,193 A | * 10/1996 | Kawahara | 348/223 |
| 5,652,621 A | * 7/1997 | Adams, Jr. et al. | 348/272 |
| 5,668,596 A | * 9/1997 | Vogel | 348/222 |
| 5,929,906 A | * 7/1999 | Arai et al. | 348/223 |
| 5,995,142 A | * 11/1999 | Matsufune | 348/223 |
| 6,057,889 A | * 5/2000 | Reitmeier et al. | 348/555 |
| 6,133,953 A | * 10/2000 | Okada | 348/272 |
| 6,184,925 B1 | * 2/2001 | Abe et al. | 348/223 |
| 6,219,096 B1 | * 4/2001 | Terashima | 348/223 |
| 6,256,062 B1 | * 7/2001 | Endo | 348/223 |
| 2001/0009438 A1 | * 7/2001 | Kihara et al. | 348/223 |

* cited by examiner

Primary Examiner—Wendy R. Garber
Assistant Examiner—Lin Ye

(57) ABSTRACT

A color correcting apparatus is arranged to enable color matching between a plurality of video cameras by operating each camera without requiring a reference camera. A color matching processing section provided in a camera control unit for each camera generates a reference signal representing colors of a standard color chart. When color matching is performed between a plurality of video cameras, the color matching processing section detects information corresponding to the difference between the reference signal and a color signal obtained by forming an image of the standard color chart with one camera, and sends the detected information as color error data to a CPU. The CPU calculates setting data necessary for color correction performed by the color matching processing section, and sends the setting data to the color matching processing section. In normal use of the apparatus, the color matching processing section performs color correction based on the setting data.

20 Claims, 14 Drawing Sheets

COLOR CONNECTING APPARATUS FOR A VIDEO CAMERA

BACKGROUND OF THE INVENTION

1. Field of the Invention

The present invention relates to a color correcting apparatus for color matching between a plurality of image pickup apparatuses.

2. Description of the Related Art

In using a plurality of video cameras in a broadcasting station, there is a need for strict color matching between the video cameras. Image pickup apparatuses such as broadcasting station cameras, however, have color filters or color separating prisms placed in front of their charge-coupled devices (CCD), and the color filters or color prisms differ slightly from each other in spectroscopic characteristics. Unless such a difference is compensated, image outputs from the apparatuses cannot be made uniform. As means for solving this problem, there is a technique in U.S. Ser. No. 08/667,459 (filed on Jun. 21, 1996) with a title "VIDEO CAMERA AND VIDEO CAMERA SYSTEM", which was assigned to the assignee of the present application, and there is another technique in the application with a tile "COLOR CORRECTION APPARATUS, COLOR CORRECTION CONTROLLER, AND COLOR CORRECTION SYSTEM", Agent Ref. No. 450100-4105, Assignee Ref. No. S97P817US00 (filed on Sep. 2, 1997). Each of these techniques is based on a process in which colors obtained as a particular color, e.g., each of colors in a color chart by an image pickup apparatus which is used as a reference and with another image pickup apparatus which is subject to color matching with the reference image pickup apparatus are measured under the same condition, and data obtained as the results of this measurement is used to compensate color data which is obtained by the image pickup operation of the image pickup apparatus which is subject to color matching.

The above-described techniques, however, require, for color matching between a plurality of image pickup apparatuses, troublesome operations of designating colors about which color matching will be performed, and measuring each of corresponding colors through the plurality of apparatuses. The above-described techniques also require, for color matching between a plurality of image pickup apparatuses, always setting one image pickup apparatus as a reference and storing color data of this image pickup apparatus. Selection of an image pickup apparatus used as a reference is difficult and a reference image pickup apparatus or color data obtained by a reference image pickup apparatus is always required for color matching. Each of the above-described techniques does not make it unconditionally possible to execute color matching anytime and anywhere, and does not adequately facilitate color matching.

SUMMARY OF THE INVENTION

In view of the above-described problems, an object of the present invention is to provide a color correcting apparatus and a color correction control apparatus arranged to easily perform color matching between a plurality of image pickup apparatuses by operating each of the image pickup apparatuses without requiring an image pickup apparatus used as a reference.

Another object of the present invention is to provide a color correcting apparatus and a color correction control apparatus arranged to easily perform color matching with respect to a plurality of colors.

To achieve the above-described objects, according to one aspect of the present invention, there is provided an image pickup apparatus comprising color image pickup means for obtaining a color image pickup signal by converting light from an object into an electrical signal, color correction means for correcting a color of the color image pickup signal based on color correction information, reference color signal forming means for forming a reference color signal for the color image pickup signal, the reference color signal forming means being provided in the image pickup apparatus, error signal output means for detecting a difference between the color image pickup signal and the reference color signal, and for outputting the difference as an error signal, and color correction information forming means for forming the color correction information on the basis of the error signal.

According to another aspect of the present invention, there is provided a color correcting apparatus which corrects a color of a color image pickup signal formed by color image pickup means, the apparatus comprising color correction means for correcting a color of the color image pickup signal based on color correction information, reference color signal forming means for forming a reference color signal for the color image pickup signal, the reference color signal forming means being provided in the color correcting apparatus, error signal output means for detecting a difference between the color image pickup signal and the reference color signal, and for outputting the difference as an error signal, and color correction information forming means for forming the color correction information on the basis of the error signal.

DESCRIPTION OF THE PREFERRED EMBODIMENTS

Figure 1:
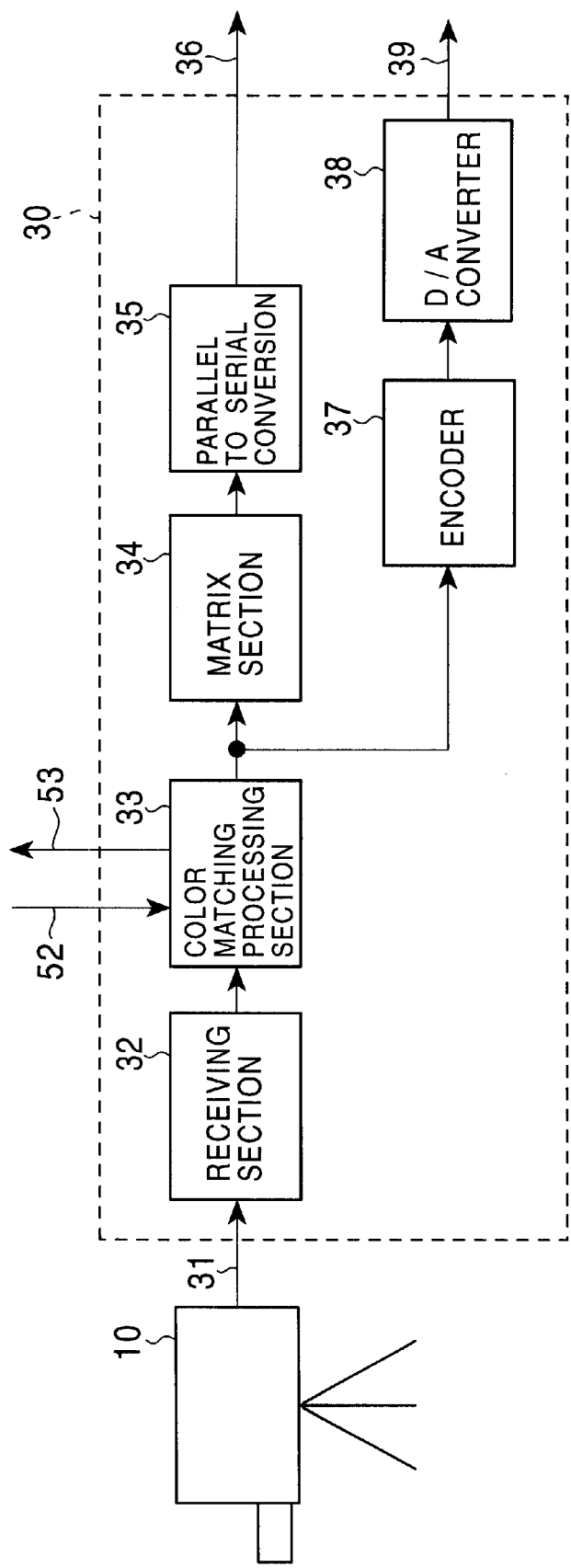
FIG. 1 is a block diagram showing the configuration of a camera system which includes a color correcting apparatus which represents a first embodiment of the present invention.

Embodiments of the present invention will be described below in detail with reference to the accompanying drawings. FIG. 1 is a block diagram showing the configuration of a camera system which includes a color correcting apparatus which represents a first embodiment of the present invention. This camera system has a video camera 10 which forms a main body of an image pickup apparatus, and a camera control unit (hereinafter referred to simply as "CCU") 30 for controlling the video camera 10. The camera control unit 30 is provided separately from the video camera 10 and connected to the same. The video camera 10 has a camera head unit (hereinafter referred to as "CHU") forming an electronic circuit section.

Figure 2:
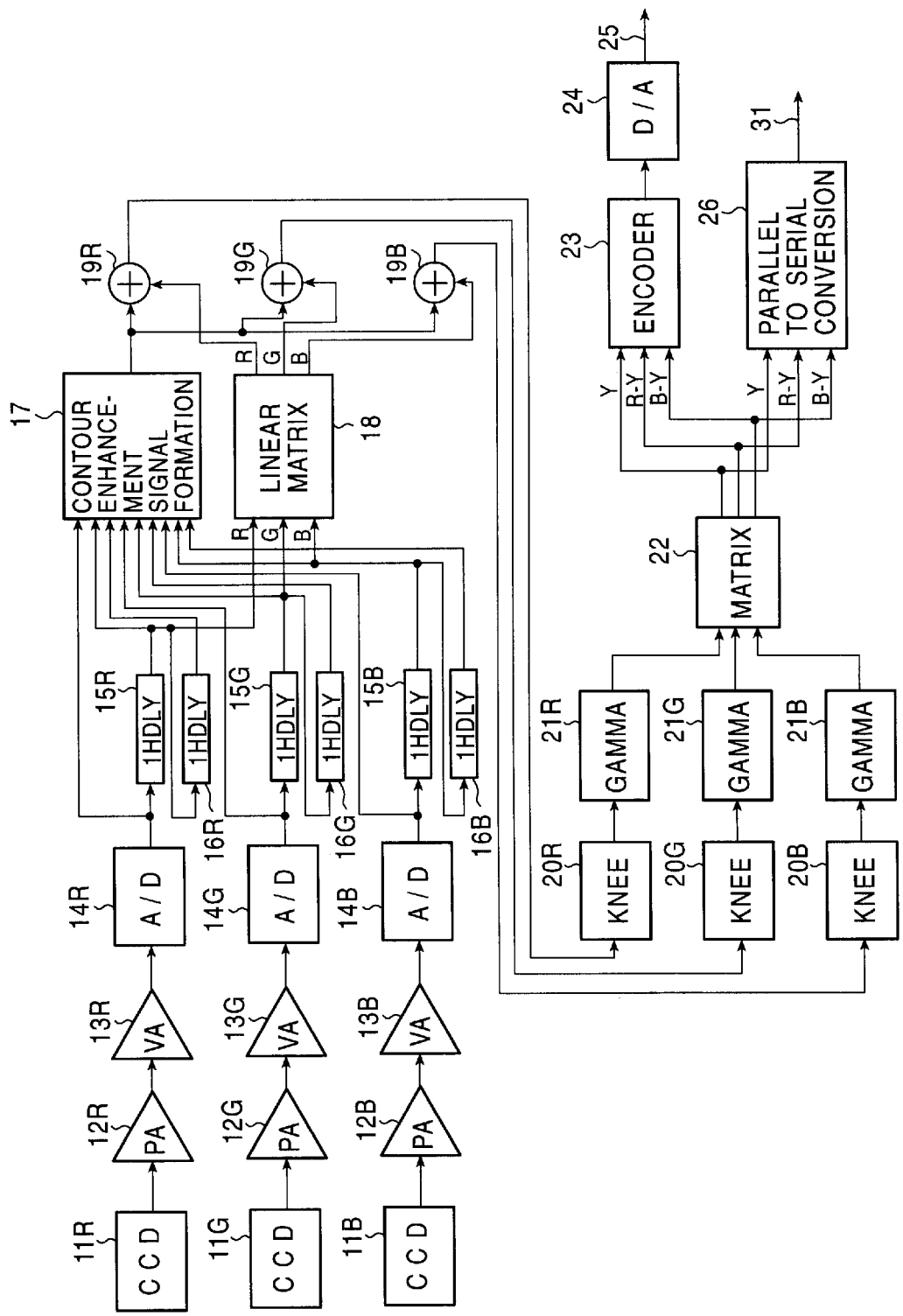
FIG. 2 is a block diagram showing the configuration of a camera head unit in video camera shown in FIG. 1.

FIG. 2 is a block diagram showing the configuration of the CHU in the video camera 10 shown in FIG. 1. This CHU has three charge-coupled devices (CCD) 11R, 11G, and 11B, which are image pickup devices. An image pickup optical system which includes a color filter and a color separating prism (not shown) separates light from an object into red light, green light and blue light, and images these lights on the CCD 11R, 11G, and 11B, respectively. The CCD 11R, 11G, and 11B respectively form a red image, a green image and a blue image and output a red signal (hereinafter referred to as "R signal"), a green signal (hereinafter referred to as "G signal") and a blue signal (hereinafter referred to as "B signal").

The CHU also has preamplifiers 12R, 12G, and 12B for amplifying R, G, and B signals output from the CCD 11R, 11G, and 11B; video amplifiers 13R, 13G, and 13B which are supplied with output signals from the preamplifiers 12R, 12G, and 12B, and which adjust the black level and the white level of these signals; analog to digital converters (hereinafter referred to as "A/D converters") 14R, 14G, and 14B for analog to digital (A/D) conversion of output signals from the video amplifiers 13R, 13G, and 13B; delay circuits 15R, 15G, and 15B for delaying output signals from the A/D converts 14R, 14G, and 14B by one horizontal period (1H); delay circuits 16R, 16G, and 16B for delaying output signals from the delay circuits 15R, 15G, and 15B by one horizontal period (1H); and a contour enhancement signal forming circuit 17 which is supplied with output signals from the A/D converts 14R, 14G, and 14B and with output signals from the delay circuits 15R, 15G, 15B, 16R, 16G, and 16B, and which forms a contour enhancement signal for intensifying a contour based on the supplied signals by amplifying high-frequency components with respect to horizontal and vertical directions.

The CHU further has a linear matrix circuit 18 which is supplied with the output signals from the delay circuits 15R, 15G, and 15B, and which corrects a color reproduction error due to a difference of spectroscopic image pickup characteristics of the video camera from ideal spectroscopic image pickup characteristics of, for example, the NTSC system; adders 19R, 19G, and 19B each of which calculates the sum of the corresponding one of R, G, and B signals from the linear matrix circuit 19 and the contour enhancement signal output from the contour enhancement signal forming circuit 17; knee circuits 20R, 20G, and 20B for compressing the signal levels of high-luminance portions of output signals from the adders 19R, 19G, and 19B to increase the apparent dynamic range; and gamma correction circuits 21R, 21G, and 21B for performing gamma correction by multiplying each of output signals from the knee circuits 20R, 20G, and 20B by the inverse function of the voltage-luminance characteristic of a receiver.

The CHU further has a matrix circuit 22 for converting R, G, and B signals output from the gamma correction circuits 21R, 21G, and 21B into a luminance signal (hereinafter referred to as "Y signal"), a red color-difference signal (hereinafter referred to as "R-Y signal") and a blue color-difference signal (hereinafter referred to as "B-Y signal"); an encoder 23 which is supplied with output signals from the matrix circuit 22, and which forms and outputs a color video signal in accordance with the NTSC system, PAL system or the like by performing necessary processings such as color modulation processing, sync signal addition processing, and processing for summation of the luminance signal and the color signals; a digital to analog (D/A) converter 24 which forms and outputs an analog composite signal 25 by performing digital to analog conversion of an output signal from the encoder 23; and a parallel to serial conversion circuit 26 which forms and outputs a serial digital video signal 31 by performing parallel to serial conversion of output signals from the matrix circuit 22.

The operation of the CHU shown in FIG. 2 will now be described. In the CHU, R, G, and B signals output from the CCDs 11R, 11G, and 11B are respectively amplified by the preamplifiers 12R, 12G, and 12B, and the black level and the white levels of the R, G, and B signals are adjusted by the video amplifiers 13R, 13G, and 13B. The R, G, and B signals then undergoes A/D conversion performed by the A/D converters 14R, 14G, and 14B, and are delayed by one horizontal period by delay circuits 15R, 15G, and 15B, and are further delayed by one horizontal period by delay circuits 16R, 16G, and 16B. The contour enhancement signal forming circuit 17 is supplied with output signals from the A/D converters 14R, 14G, and 14B and with output signals from the delay circuits 15R, 15G, 15B, 16R, 16G, and 16B, and forms and outputs a contour enhancement signal on the basis of the supplied signals. The linear matrix circuit 18 is supplied with the output signals from the delay circuits 15R, 15G, and 15B and corrects a color reproduction error. Each of the adders 19R, 19G, and 19B calculates the sum of the corresponding one of R, G, and B signals output from the linear matrix circuit 18 and the contour enhancement signal output from the contour enhancement signal forming circuit 17. Output signals from the adders 19R, 19G, and 19B undergo processing in the knee circuits 20R, 20G, and 20B and processing in the gamma correction circuits 21R, 21G, and 21B, and are thereafter converted into Y, R-Y, and B-Y signals by the matrix circuit 22. The Y, R-Y, and B-Y signals are output to the encoder 23 and to the parallel to serial conversion circuit 26. The encoder 23 processes the output signals from the matrix circuit 22 by performing necessary processings such as color modulation processing, sync signal addition processing, and processing for summation of the luminance signal and the color signals, thereby forming and outputting a color video signal in accordance with the NTSC system, PAL system or the like. The output signal from the encoder 23 in a digital form is converted into an analog signal by the D/A converter 24 to be output as analog composite video signal 25. On the other hand, the parallel to serial conversion circuit 26 forms and outputs serial digital video signal 31 by performing parallel to serial conversion of the output signals from the matrix circuit 22. This serial digital video signal 31 is input to the CCU 30 shown in FIG. 1.

The configuration of the CCU 30 shown in FIG. 1 will next be described. The CCU 30 has a receiving section 32 which receives and demodulates serial digital video signal 31 modulated and transmitted by the CHU of the video camera 10; a color matching processing section 33 which is supplied with output signals from the receiving section 32, and which detects data necessary for color matching and performs color matching; a matrix section 34 which converts output signals from the color matching processing section 33 into a D1 format signal; a parallel to serial conversion circuit 35 which forms and outputs a serial digital video signal 36 by performing parallel to serial conversion of an output signal from the matrix section 34; an encoder 37 which forms and outputs a color video signal in accordance with the NTSC system, PAL system or the like by performing necessary processings such as color modulation processing, sync signal addition processing, and processing for summation of the luminance signal and color signals; and a D/A converter 38 which forms and outputs an analog composite video signal 39 by performing digital to analog conversion of an output signal from the encoder 37.

The operation of the CCU 30 shown in FIG. 1 will be described briefly. The receiving section 32 obtains R, G, B signals or Y, R-Y, and B-Y signals by demodulating digital video signal 31 modulated and transmitted by the CHU of the video camera 10, and outputs these signals to the color matching processing section 33. The color matching processing section 33 detects data necessary for color matching and performs color matching, as described below in detail.

The output signals from the color matching processing circuit 33 are input to the matrix section 34 and to the encoder 37. The matrix section 34 converts the R, G, B signals or Y, R-Y, and B-Y signals output from the color matching processing section 33 into a signal in the D1 format (4:2:2, 10-bit, 27 MHz). This signal is converted into a signal in the serial digital interface (SDI) format (1 bit, 270 MHz) by parallel to serial conversion in the parallel to serial conversion circuit 35 to be output as serial digital video signal 36 from the CCU 30. On the other hand, the encoder 37 forms and outputs a color video signal in accordance with the NTSC system, PAL system or the like by performing necessary processings such as color modulation processing, sync signal addition processing, and processing for summation of the luminance signal and color signals. The output signal from the encoder 37 in a digital form is converted into an analog signal by digital to analog conversion in the D/A converter 38 to be output as analog composite video signal 39 from the CCU 30.

The CCU 30 may also comprise, as well as the components shown in FIG. 1, a signal formation section for forming a sync signal synchronized with a reference video signal which is input from the outside, a signal processing section for performing signal processing of a return video signal which is externally supplied from a camera other than video camera 10, a transmitting section for transmitting a return video signal to the outside, and an audio signal processing section for processing an audio signal, etc. However, such sections are not shown in FIG. 1 since they do not essentially relate to color matching processing in this embodiment.

Figure 3:
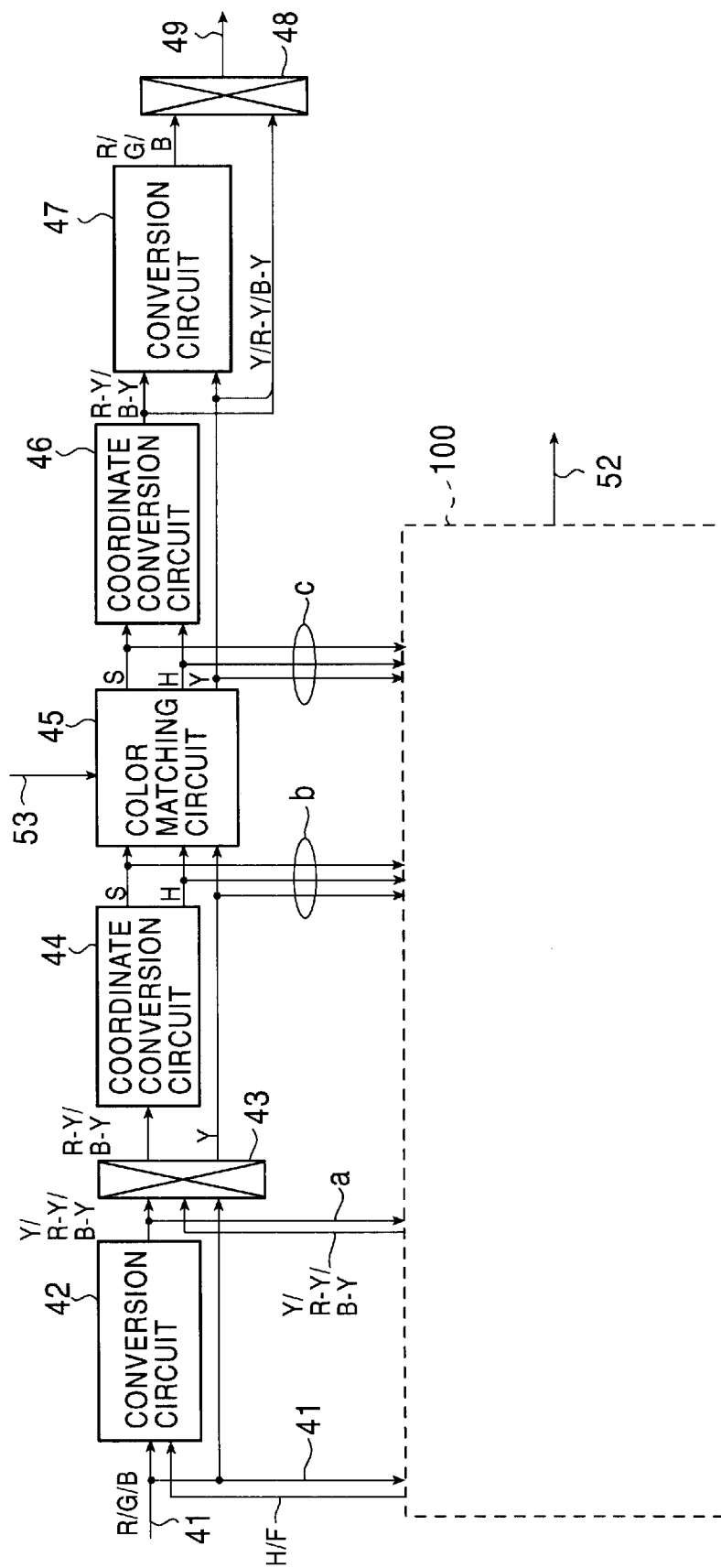
FIG. 3 is a block diagram showing the configuration of a color matching processing section in a camera control unit shown in FIG. 1.

FIG. 3 is a block diagram showing the configuration of the color matching processing section 33 in the CCU 30 shown in FIG. 1. The color matching processing section 33 has a conversion circuit 42 which is supplied with signal 41 from the receiving section 32, and which converts R, G, and B signal into Y, R-Y, and B-Y signal; a switch circuit 43 which outputs signal 41 from the receiving section 32, an output signal from the conversion circuit 42 and Y, R-Y, and B-Y signals from a below-described color error data formation section 100 by changing these signals; a coordinate conversion circuit 44 which converts R-Y and B-Y signals output from the switch circuit 43 into a saturation signal S and a hue signal H by polar coordinate conversion; and a color matching circuit 45 which is supplied with saturation signal S and hue signal H output from the coordinate conversion circuit 44, and Y signal output from the switch circuit 43, and which correct these signals by processing described below. Y signal represents luminance level. Symbols Y, S, and H will also be used to represent the levels of Y signal, saturation signal S and hue signal H, i.e., the values of luminance level, saturation and hue.

The color matching section 33 also has a coordinate conversion circuit 46 which converts saturation signal S and hue signal H output from the color matching circuit 45 into R-Y and B-Y signals by rectangular coordinate conversion; a conversion circuit 47 which converts Y signal output from the color matching circuit 45 and R-Y and B-Y signals output from the coordinate conversion circuit 46 into R, G, and B signals; and a switch circuit 48 which selectively outputs, as output signal 49 from the color matching processing section 33, a group of R, G, and B signals output from the conversion circuit 47 or a group of Y signal output from the color matching circuit 45 and R-Y and B-Y signals output from the coordinate conversion circuit 46.

The color matching section 33 further has the color error data formation section 100 which generates a reference color signal used as information on a reference for predetermined colors, and which forms color error data 52 corresponding to the difference between the reference color signal and a signal obtained by picking up the predetermined colors with camera 10, color error data 52 being used for determination of contents of correction in the color matching circuit 45. Color error data 52 is sent to a central processing unit (CPU) described below. The color matching circuit 45 is supplied with setting data 53 sent from the CPU.

Figure 4:
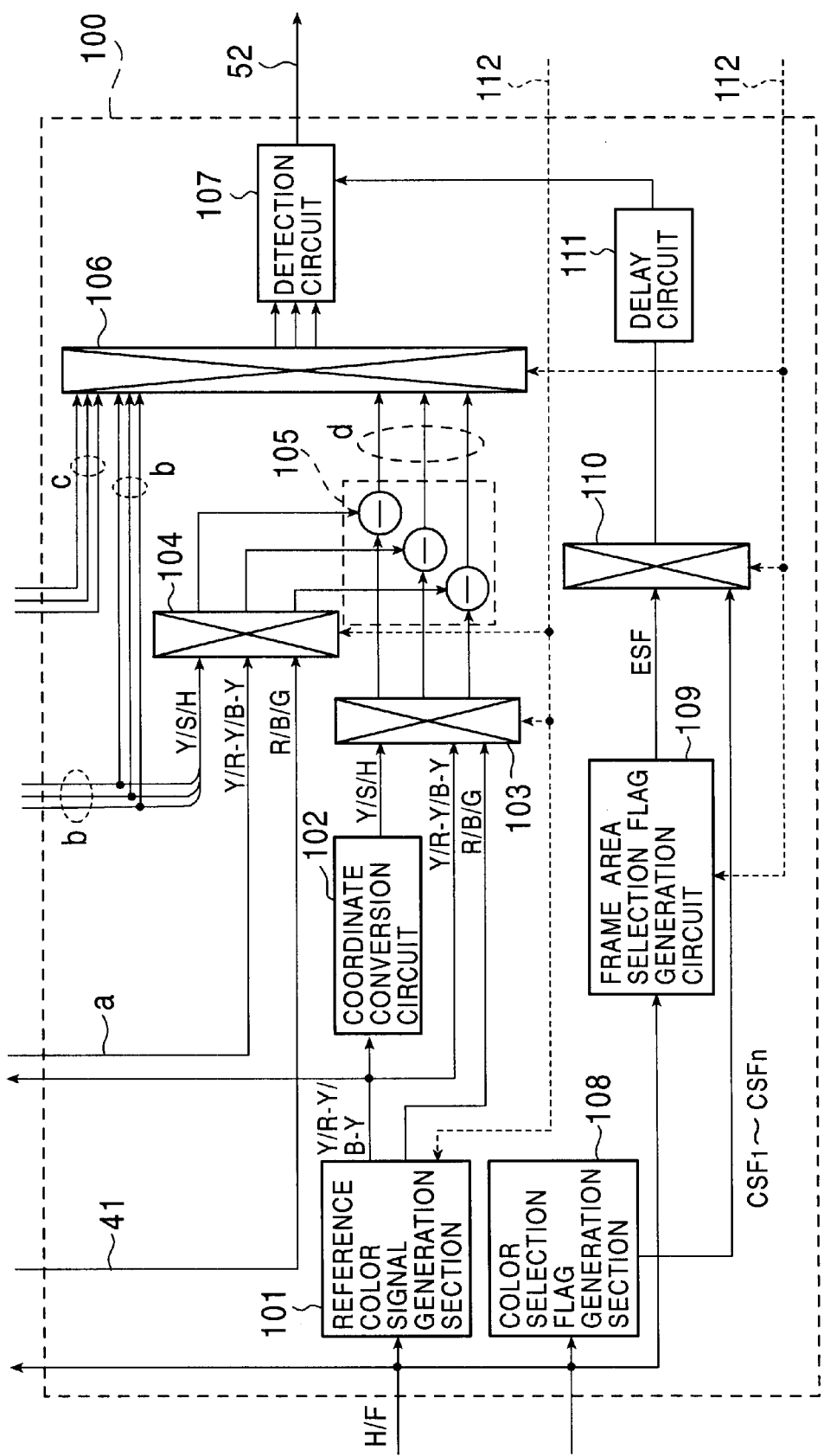
FIG. 4 is a block diagram showing the configuration of a color error data forming section shown in FIG. 3.

The color error data formation section 100 will next be described in detail with reference to FIG. 4. In FIG. 4, a control signal from the CPU is indicated at 112. The color error data formation section 100 has a reference color signal generation section 101 which generates a reference color signal representing a plurality of colors contained in a standard color chart. The reference color signal generation section 101 is arranged to output a reference color signal in the form of Y, R-Y, and B-Y signals or R, G, and B signals according to a control signal 112 from the CPU. The color error data formation section 100 also has a coordinate conversion circuit 102 which converts Y, R-Y, and B-Y signals output from the reference color signal generation section 101 into Y, S, and H signals by polar coordinate conversion, and a switch circuit 103 which selectively outputs a group of Y, R-Y, and B-Y signals or R, G, and B signals which are output signals from the reference color signal generation section 101 or a group of Y, S, and H signals which are output signals from the coordinate conversion circuit 102. Y, R-Y, and B-Y signals output from the reference signal generation section 101 are also input to the switch circuit 43. The reference color signal generated by the reference color signal generation section 101 can also be finely adjusted by control signal 112 from the CPU.

In the signals input to the color error data formation section 100, the group of Y, R-Y, and B-Y signals output from the conversion circuit 42 will be referred to as signal a, the group of signal S and H output from the coordinate conversion circuit 44 and Y signal output from the switch circuit 43 will be referred to as signal b, and the group of Y, S, and H signals output from the color matching circuit 45 will be referred to as signal c.

The color error data formation section 100 further has a switch circuit 104 which selectively outputs signal 41, signal a, or signal b; a subtraction section 105 which subtracts an output signal from the switch circuit 104 from the output signal from the switch circuit 103, and which outputs the result of this subtraction as color error signal d; a switch circuit 106 which selectively outputs signal b, signal c, or color error signal d; and a detection circuit 107 which detects the level of the signal output from the switch circuit 106 to obtain color error data 52 or color data, and which outputs color error data 52 or color data to the CPU.

The color error data formation section 100 further has a color selection flag generation section 108 which generates color selection flags $CSF_1$ to $CSF_n$ supplied to the detection circuit 107 when color error signal d is output to the detection circuit 107 by the switch circuit 106, and a frame area selection flag generation section 109 which generates a frame area selection flag ESF supplied to the detection circuit 107 when signal b or signal c is output to the detection circuit 107 by the switch circuit 106. Color selection flags $CSF_1$ to $CSF_n$ are flags for selecting, from the output signal from the switch circuit 106, portions corresponding to the plurality of colors contained in the standard color chart when an image of the color chart is formed by the video camera 10. Frame area selection flag ESF is a flag for selecting portions corresponding to a desired area in a frame from the output signal from the switch circuit 106. The timing of generation of frame area selection flag ESF in the frame area selection flag generation section 109 is controlled through control signal 112 from the CPU.

The color error data formation section 100 further has a switch circuit 110 which selectively outputs, to the detection circuit 107, the signal of color selection flags $CSF_1$ to $CSF_n$ output from the color selection flag generation section 108 or frame area selection flag ESF output from the frame area selection flag generation section 109, and a delay circuit 111 which supplies the detection circuit 107 with the output signal from the switch circuit 110 while delaying the signal by a predetermined time period.

The signal changing operations of the switch circuits 103, 104, 106, and 110 are controlled through control signal 112 from the CPU. The reference color signal generation section 101, the color selection flag generation section 108, the frame area selection flag generation section 109 and the conversion circuit 42 (FIG. 3) are arranged so as to operate in synchronization with each other in accordance with a horizontal synchronization signal and a vertical synchronization signal (hereinafter referred to as "sync signal H/F") supplied from the outside.

Figure 5:
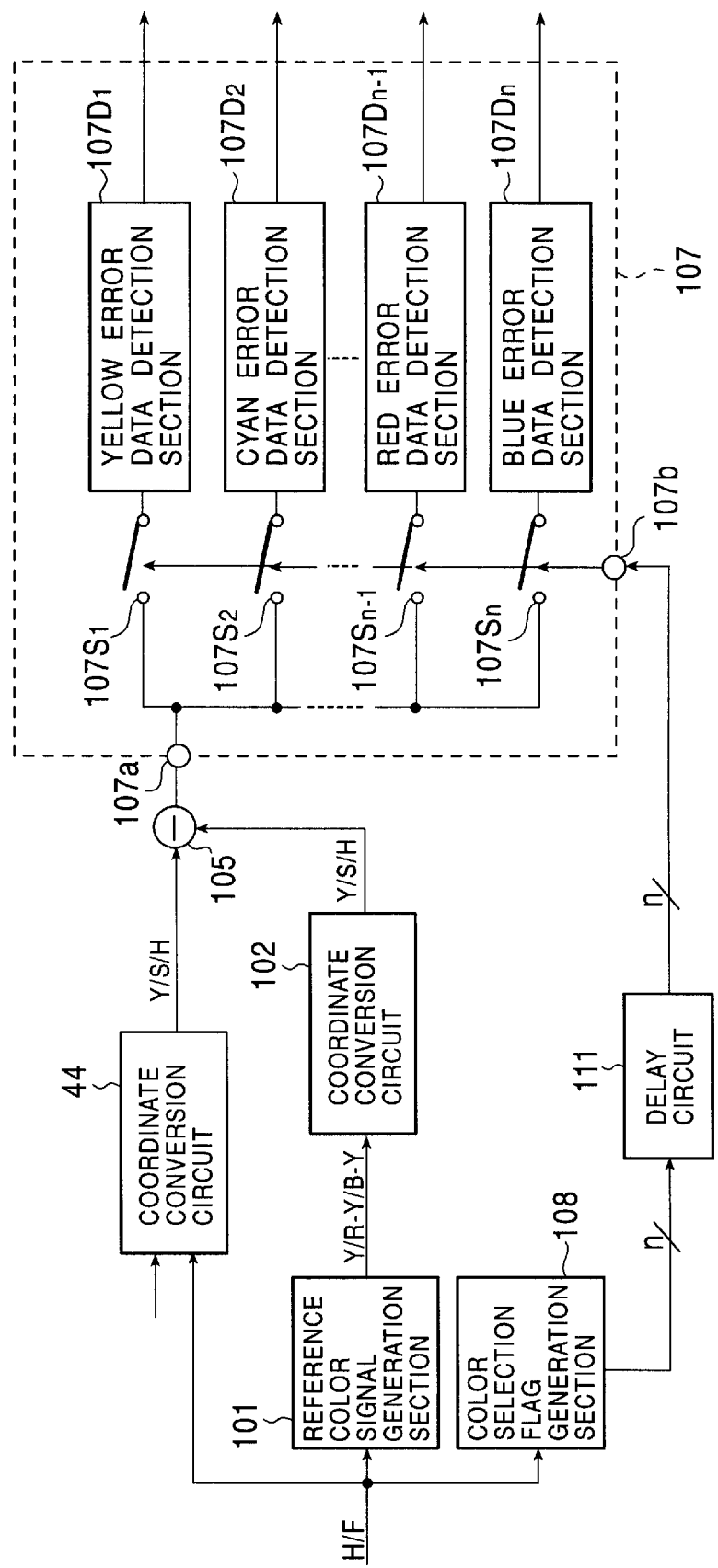
FIG. 5 is a block diagram showing the configuration of a detection circuit shown in FIG. 4.

The configuration of the detection circuit 107 will next be described with reference to FIG. 5. FIG. 5 is a schematic diagram of the color error data generation section 100 for explaining the configuration and operation of the detection circuit 107 by way of example with respect to a case where Y, S, and H signals are selected by the switch circuits 103 and 104, and where color error signal d is elected by the switch circuit 106. The configuration of the sections of the color error data formation section 100 other than the detection circuit 107 are shown in a simplified fashion. The detection circuit 107 has a signal input section 107a through which signals output from the switch circuit 106 are input; a flag input section 107b through which color selection flags $CSF_1$ to $CSF_n$ output from the color selection flag generation section 108 or frame area selection flag ESF output from the frame area selection flag generation section 109 is input; switches $107S_1$ to $107S_n$ controlled through color selection flags $CSF_1$ to $CSF_n$ or frame area selection flag ESF input through the flag input section 107b; and color error detection sections $107D_1$ to $107D_n$ connected to the signal input section 107a through the switches $107S_1$ to $107S_n$. The color error detection sections $107D_1$ to $107D_n$ respectively correspond to the colors contained in the standard color chart. In the example shown in FIG. 5, the color error detection sections $107D_1$ to $107D_n$ are related to yellow, cyan, green, magenta, red, and blue excluding white in the standard color chart containing white, yellow, cyan, green, magenta, red, and blue.

Each of color selection flags $CSF_1$ to $CSF_n$ output from the color selection flag generation section 108 is a binary value 0 or 1. When the value of one of color selection flags $CSF_1$ to $CSF_n$ is 1, the corresponding one of the switches $107S_1$ to $107S_n$ is closed. When the value of the color flag is 0, the corresponding one of the switches $107S_1$ to $107S_n$ is open.

Each of the error detection sections $107D_1$ to $107D_n$ sums up (integrates) signals input through the corresponding one of the switches $107S_1$ to $107S_n$ to obtain color error data (if color error signal d is selected by the switch circuit 106) or color data (if signal b or signal c is selected by the switch circuit 106), and outputs this data. A set of color error data from the color error data detection sections $107D_1$ to $107D_n$ forms color error data 52 which is output from the detection circuit 107. A set of color data from the color error data detection sections $107D_1$ to $107D_n$ forms color data which is output from the detection circuit 107. Each of the color error data detection sections $107D_1$ to $107D_n$ is formed of, for example, an integrator.

In FIG. 5, one of the switches $107S_1$ to $107S_n$ and one of the color error data detection sections $107D_1$ to $107D_n$ are shown in one to one relationship with each color. Actually, however, each of the switches $107S_1$ to $107S_n$ and the color error data detection sections $107D_1$ to $107D_n$ has sections forming three channels since three color error signals or Y, S, and H signals are input to the detection circuit 107.

The operation of the color matching processing section 33 shown in FIGS. 3 and 4 will now be outlined. Signal 41 input to the color matching processing section 33 is a group of R, G, and B signals or a group of Y, R-Y, and B-Y signals. If signal 41 is a group of R, G, and B signals, R, G, and B signals are converted into Y, R-Y, and B-Y signals by the conversion circuit 42, and Y, R-Y, and B-Y signals are output to the switch circuit 43. The switch circuit 43 selects and outputs the output signals from the conversion circuit 42. On the other hand, if signal 41 is a group of Y, R-Y, and B-Y signals, it is selected and output by the switch circuit 43. This processing enables signal transmission from the CHU to the CCU 30 to be adapted to each of transmission of R, G, and B signals and transmission of Y, R-Y, and B-Y signals.

R-Y, and B-Y signals output from the switch circuit 43 are converted into saturation signal S and hue signal H by the coordinate conversion circuit 44. Saturation signal S and hue signal H output from the color matching circuit 45 and Y signal output from the switch circuit 43 are corrected by the color matching circuit 45. Saturation signal S and hue signal H output from the color matching circuit 45 are converted into R-Y and B-Y signals by the coordinate conversion circuit 46. Further, Y signal output from the color matching circuit 45 and R-Y and B-Y signals output from the coordinate conversion circuit 46 are converted into R, G, and B signals by the conversion circuit 47. To obtain R, G, and B signals as output signal 49 from the color matching processing section 33, R, G, and B signals output from the conversion circuit 47 are selected by the switch circuit 48 to be output as output signal 49. On the other hand, to obtain Y, R-Y, and B-Y signals as output signal 49 from the color matching processing section 33, Y signal output from the color matching circuit 45 and R-Y and B-Y signals output from the coordinate conversion circuit 46 are selected by the switch circuit 48 to be output as output signal 49. The above-described operation is performed in normal use of the apparatus without being limited to special adjustment.

The color matching processing section 33 also performs the operation of detecting color error data 52 required by the CPU in calculating setting data 53 as well as the above-described operation in normal use. When the detection operation is performed, the color error data formation section 100 is set so that the switch circuits 103 and 104 select the same kind of signals from the three kinds of input signals, the switch circuit 106 selects color error signal d, and the switch circuit 110 selects color selection flags $CSF_1$ to $CSF_n$. If the switch circuits 103 and 104 select Y, S, H signals or Y, R-Y, and B-Y signals by control signals 112 from the CPU, the reference color signal generation section 101 generates Y, R-Y, and B-Y signals as a reference color signal. If the switch circuits 103 and 104 select R, G, and B signals, the reference color signal generation section 101 generates R, G, and B signals as a reference color signal.

When detection of color error data 52 is made in the color matching processing section 33, an image of the standard color chart is formed with the video camera 10 under the above-described setting. At this time, the switch circuit 104 selects Y, S, and H signals, Y, R-Y, and B-Y signals, or R, G, and B signals obtained by forming an image of the standard color chart with the video camera 10, and outputs the selected signals to the subtraction circuit 105.

On the other hand, the reference color signal generation section 101 generates a reference color signal representing the plurality of colors in the image of the standard color chart formed by the video camera 10. This reference color signal comprises Y, R-Y, and B-Y signals or R, G, and B signals, which are input to the switch circuit 103. Y, R-Y, and B-Y signals generated by the reference color signal generation circuit 101 are converted into Y, S, and H signals by the coordinate conversion circuit 102. These Y, S, and H signals are also input to the switch circuit 103. The switch circuit 103 selects Y, R-Y, and B-Y signals, Y, S, and H signals, or R, G, and B signals and outputs the selected signals to the subtraction circuit 105.

The subtraction circuit 105 subtracts the output signal supplied from the switch circuit 104 from the output signal supplied from the switch circuit 103 to form color error signal d, and outputs this signal to the switch circuit 106. The switch circuit 106 selects and outputs color error signal d to the detection circuit 107.

The operation in the case where the switch circuits 103 and 104 select Y, S, and H signals will be described by way of example. If, for example, the saturation signal in the yellow reference signal output from the reference color signal generation section 101 is $Sr_y$; the yellow saturation signal in the output signal from the switch circuit 104 is $Sx_y$; and the yellow color error signal output from the subtraction circuit 105 is $DS_y$, then the color error signal $DS_y$ is given by the following equation:

$$DS_y = Sr_y - Sx_y$$

The operation is the same with respect to Y signal and H signal. Also, the operation is the same with respect to other colors. Color matching to a desired color can be performed by adjusting the reference color signal output from the reference color signal generation section 101 by control signal 112 from the CPU (for example, by setting the saturation signal in the yellow reference color signal to $Sr_y + \alpha$).

The color section flag generation section 108 generates color selection flags $CSF_1$ to $CSF_n$ in synchronization with the reference color signal output from the reference color signal generation section 101. The color selection flags $CSF_1$ to $CSF_n$ are supplied to the detection circuit 107 via the switch circuit 110 and after being delayed by a predetermined time period by the delay circuit 111. The delay time of the delay circuit 111 is set to such a value that the timing of inputting color error signal d corresponding to each color of the standard color chart to the detection circuit 107 and the timing of supplying the corresponding one of color selection flags $CSF_1$ to $CSF_n$ to the detection circuit 107 coincide with each other.

Figure 6:
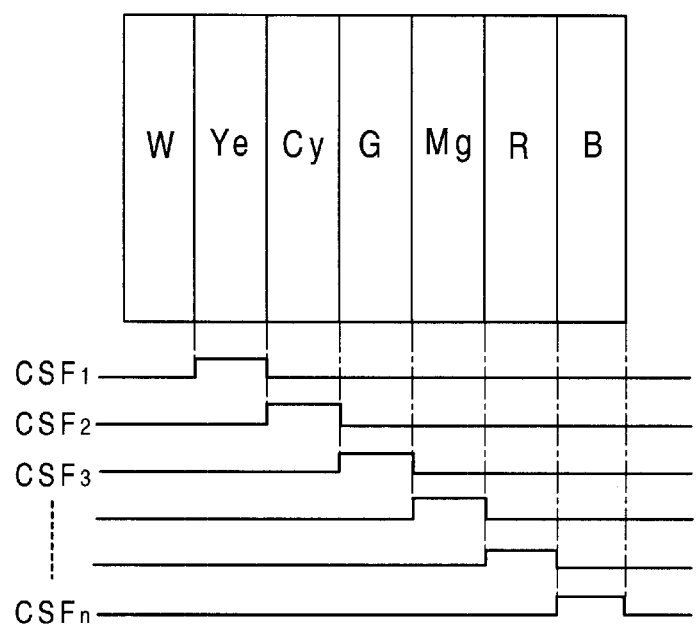
FIG. 6 is a diagram for explaining the operation of the detection circuit shown in FIG. 5.

The relationship between the standard color chart and color selection flags $CSF_1$ to $CSF_n$ will now be described with reference to FIG. 6 along with the operation of the detection circuit 107. As shown in FIG. 6, if, for example, the standard color chart is a color bar which is an image in which white, yellow, cyan, green, magenta, red, and blue portions are arranged in this order from the leftmost position, the reference color signal output from the reference color signal generation section 101 is a signal for displaying an image containing this standard color chart. Accordingly, in the portion of the reference color signal containing information on the standard color chart, portions corresponding to white, yellow, cyan, green, magenta, red, and blue forming one line exist in a time series manner. The same can be said with respect to the output signal from the switch circuit 104 obtained by forming an image of the standard color chart with the video camera 10. As shown in FIG. 6, in the reference color signal, each of color selection flags $CSF_n$ to $CSF_n$ is 1 during the time period when the corresponding one of yellow, cyan, green, magenta, red, and blue appears. In other periods, it is 0. Therefore, if the operation of opening and closing the switches $107S_1$ to $107S_n$ shown in FIG. 5 is controlled in accordance with these color selection flags $CSF_n$ to $CSF_n$, each of the color error data detection sections $107D_1$ to $107D_n$ is supplied with only the portions of color error signal d for the corresponding color and sums up the corresponding values, thus detecting color error data with respect to each color. A set of color error data on all the colors is sent as color error data 52 to the CPU 52.

Thus, in this embodiment or the present invention, color error data on a plurality of colors contained in a color chart can be simultaneously detected in one frame period.

To send color data corresponding to a desired area of an image formed by the video camera 10 to the CPU, the switch circuit 106 is set through control signal 112 from the CPU so as to select signal b or signal c and the switch 110 is also set through control signal 112 so as to select frame area selection flag ESF. Also, the frame area selection flag generation section 109 is set through control signal 112 from the CPU so as to generate frame area selection flag ESF corresponding to the desired area. In this case, frame area selection flag ESF is set so as to close only one of the switches $107S_1$ to $107S_n$ shown in FIG. 5 only for the period corresponding to the desired area.

When color data corresponding to a desired area of an image formed by the video camera 10 is sent to the CPU, the switch circuit 106 selects signal b or signal c and outputs this signal to the detection circuit 107. On the other hand, frame area selection flag ESF output from the frame area selection flag generation section 109 is supplied to the detection circuit 107 via the switch circuit 110 and after being delayed by a predetermined time period by the delay circuit 111. The detection circuit 107 detects color data corresponding to the desired area in the image formed by the video camera 10 by using the color error data detection section in the color error data detection sections $107D_1$ to $107D_n$ corresponding to the switch opened and closed by the frame area selection flag ESF, and sends the detected color data to the CPU. The switch circuit 106 is enabled to select the input signal (signal b) to the color matching circuit 45 and the output signal (signal c) from the color matching circuit 45 for the purpose of enabling the signals before and after color matching performed by the color matching circuit 45 to be compared with each other.

Also, the Y, R-Y, and B-Y signals output from the reference color signal generation circuit 101 are also input to the switch circuit 43 because, if this signal is selected by the switch circuit 43, the standard color chart based on the reference color signal generated by the reference color signal generation section 101 can be displayed.

Figure 7:
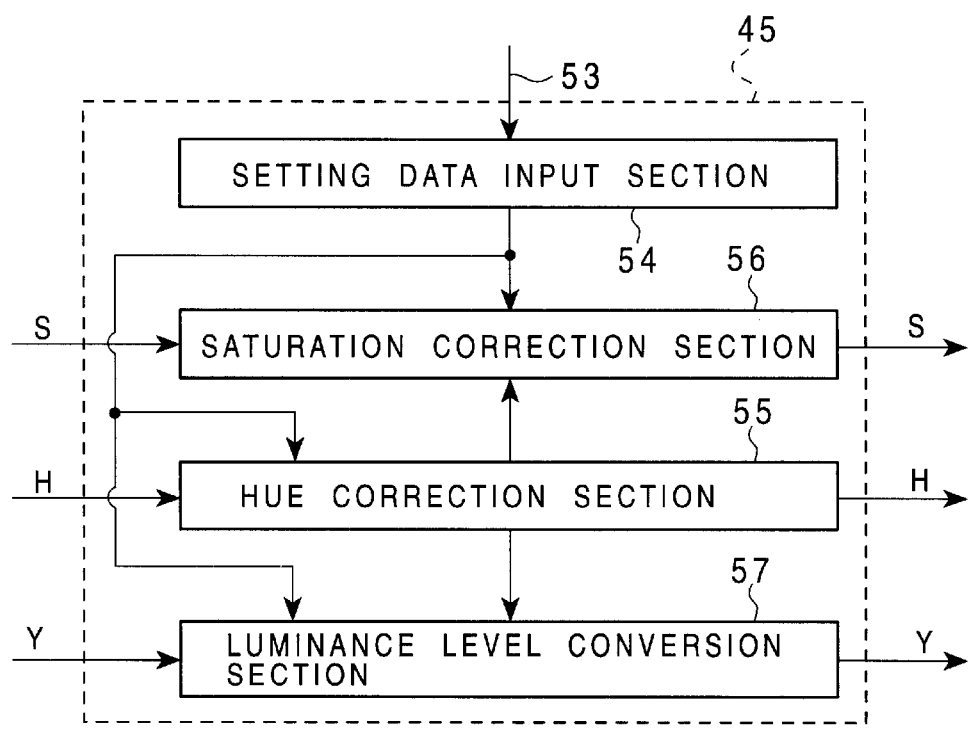
FIG. 7 is a block diagram showing the configuration of a color matching circuit shown in FIG. 3.

FIG. 7 is a block diagram showing the configuration of the color matching circuit 45 shown in FIG. 3. Referring to FIG. 7, the color matching circuit 45 has a setting data input section 54 which inputs setting data 53 sent from the CPU; a hue correction section 55 which corrects hue signal H supplied from the coordinate conversion section 44 in accordance with contents of calculation determined on the basis of the setting data input through the setting data input section 54, and outputs the corrected hue signal H; a saturation correction section 56 which corrects saturation signal S supplied from the coordinate conversion circuit 44 in accordance with contents of calculation determined on the basis of the setting data input through the setting data input section 54 and information of a correction result obtained by the hue correction section 55, and outputs the corrected saturation signal S; and a luminance level correction section 57 which corrects Y signal supplied from the switch circuit 43 in accordance with contents of calculation determined on the basis of the setting data input through the setting data input section 54 and information of a correction result obtained by the hue correction section 55, and outputs the corrected Y signal.

Figure 8:
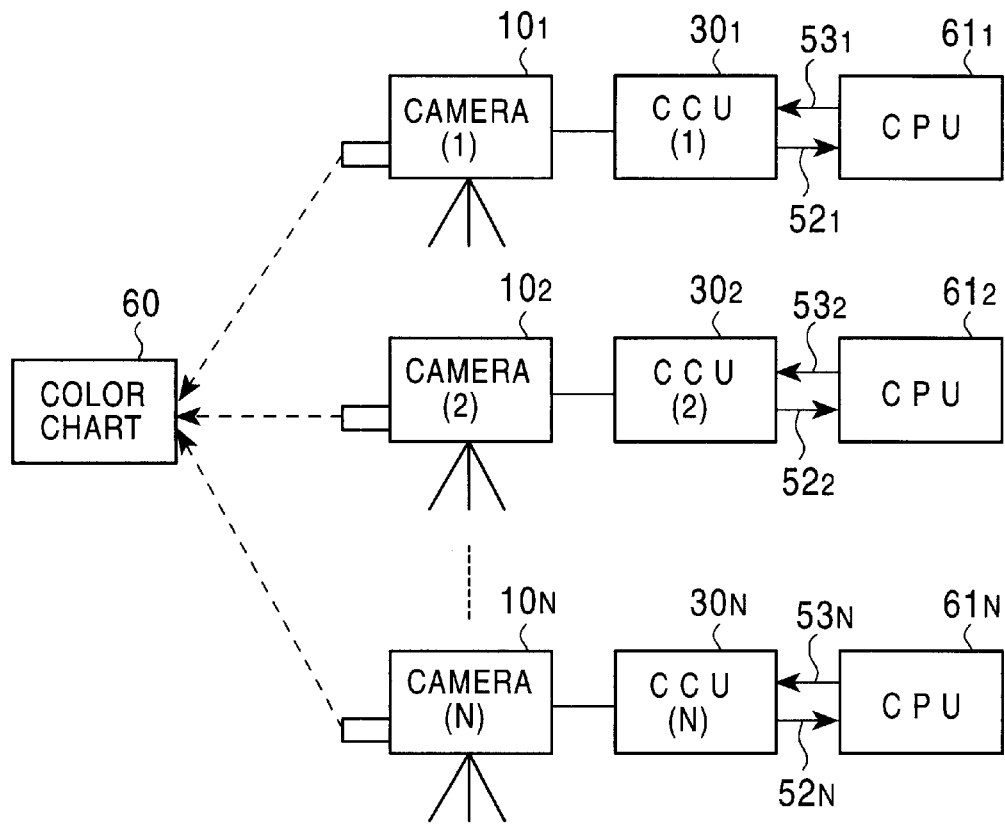
FIG. 8 is a diagram showing an example of the configuration of a system comprising a plurality of video cameras.

FIG. 8 shows the configuration of an example of a system which includes a plurality of video cameras which are subject to color matching with each other in accordance with this embodiment. In this example, CCUs (1) $30_1$ to (N) $30_N$ are connected to video cameras (1) $10_1$ to (N) $10_N$, respectively. The CHU in each of video cameras (1) $10_1$ to (N) $10_N$ has the same configuration as that shown in FIG. 2. Each of CCUs (1) $30_1$ to (N) $30_N$ has the same configuration as that shown in FIGS. 3 and 4. CPUs (1) $60_1$ to (N) $60_N$ are connected to CCUs (1) $30_1$ to (N) $30_N$, respectively. To CPUs (1) $60_1$ to (N) $60_N$, groups of color error data $52_1$ to $52_N$ are input from CCUs (1) $30_1$ to (N) $30_N$. CPUs (1) $60_1$ to (N) $60_N$ respectively calculate groups of setting data $53_1$ to $53_N$ on the basis of color error data $52_1$ to $52_N$, and output the calculated setting data to CCUs (1) $30_1$ to (N) $30_N$. Each of CPUs (1) $60_1$ to (N) $60_N$ includes a read only memory (ROM), a random access memory (RAM), etc., and is arranged to realize the functions of calculating setting data, etc., by executing a program stored in the ROM.

CPUs (1) $60_1$ to (N) $60_N$ shown in FIG. 8 may be respectively incorporated in CCUs (1) $30_1$ to (N) $30_N$ or may be provided separately from CCUs (1) $30_1$ to (N) $30_N$. In the latter case, CPUs (1) $60_1$ to (N) $60_N$ may be incorporated in a master set-up unit (MSU) provided as a controller for controlling CCUs (1) $30_1$ to (N) $30_N$. In such a case, in practice, CPUs (1) $60_1$ to (N) $60_N$ is combined into one CPU. This MSU may be the same as that disclosed in U.S. Pat. No. 5,206,732.

To perform color matching between the plurality of video cameras $10_1$ to $10_N$ in the system shown in FIG. 8, images of the same color chart are formed with video cameras (1) $10_1$ to (N) $10_N$ under the same condition but independently of each other. As a standard color chart, Machbeth Color Chart (trade name) or the like is used. For convenience' sake, FIG. 8 was drawn as if color chart 60 was simultaneously measured with video cameras (1) $10_1$ to (N) $10_N$ from different positions. Actually, however, color chart 60 is measured with each of video cameras (1) $10_1$ to (N) $10_N$ from the same position. More specifically, for example, video camera (1) $10_1$ is set on one tripod and operated to measure color chart 60, and video cameras (2) $10_2$ to (N) $10_N$ are successively set on the same tripod to measure the same color chart 60 without changing the position of the tripod.

Figure 9:
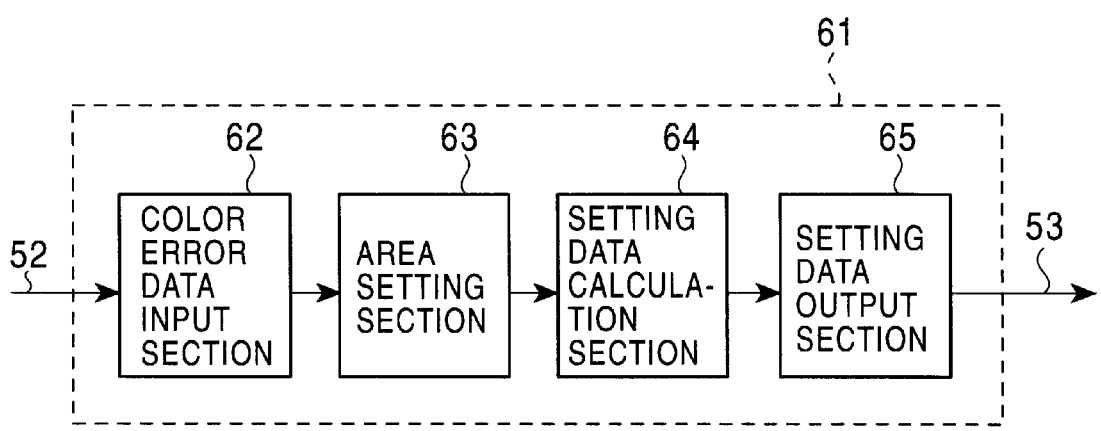
FIG. 9 is a block diagram showing the functions of CPUs shown in FIG. 8.

FIG. 9 is a function block diagram showing the functions of CPU 61 (representative of CPUs $61_1$ to $61_N$) in the system shown in FIG. 8. As shown in FIG. 9, CPU 61 has a color error data input section 62 which inputs color error data 52 from CCU 30; an area setting section 63 which sets a plurality of areas (regions) by dividing a color solid space, in which a luminance level, a hues and a saturation are indicated by coordinates, in correspondence with a plurality of predetermined colors by referring to reference color data held by CPU 61; a setting data calculation section 64 which calculates setting data with respect to each area on the basis of color error data 52 from CCU 30 and reference color data held by CPU 61; and a setting data output section 65 which sends to CCU 30 setting data 53 obtained by the setting data calculation section 64. Reference color data held by CPU 61 is data which represents information of the same color as that designated by the reference color signal generated by the reference color generation section 101 in CCU 30.

The operation of color matching between the plurality of video cameras $10_1$ to $10_N$ in the system shown in FIG. 8 will next be described. To perform this color matching, a predetermined number of colors are picked up from the same color chart 60 under the same condition by video cameras (1) $10_1$ to (N) $10_N$. Modulated video signal 31 sent from the CHU of each of video cameras $10_1$ to $10_N$ is demodulated by receiving section 32 in each CCU 30 (representative of CCUs $30_1$ to $30_N$) and is input to color matching processing section 33. In color matching processing section 33, detection circuit 107 detects color error data 52 corresponding to the difference between the reference color signal and the signal obtained by forming an image of color chart 60 with video camera 10 (representative of video cameras $10_1$ to $10_N$), and sends the detected data to CPU 61. CPU 61 supplied with this color error data 52 performs the operation described below with respect to each of video cameras $10_1$ to $10_N$.

Figure 10:
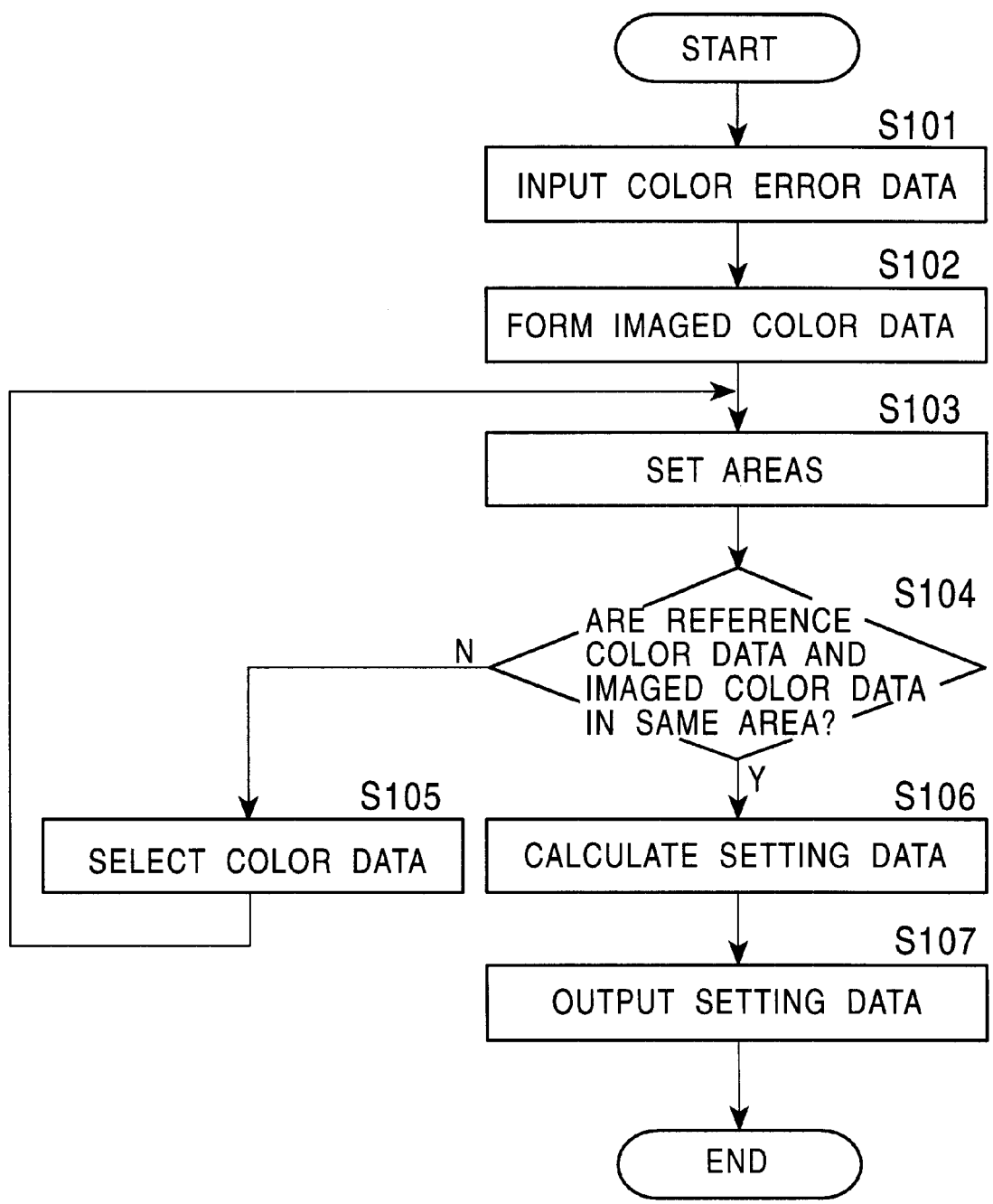
FIG. 10 is a flowchart of the operation of each CPU shown in FIG. 9 when color matching is performed.

FIG. 10 is a flowchart showing the operation of CPU 61 when color matching is performed. As shown in FIG. 10, color error data 52 from CCU 30 is input to CPU 61 through color error data input section 62 (step S101), and picked-up color data corresponding to color information obtained by forming an image of color chart 60 with video camera 10 is formed on the basis of this color error data 52 and reference color data held by CPU 61 (step S102). Specifically, picked-up color data is formed as described below. For the following description, it is assumed here that reference color data designates a luminance level, a hue and a saturation, and that color error data designates a difference in luminance level, a difference in hue, and a difference in saturation. If hue data in reference color data of a predetermined color is $H_{r1}$; hue difference data in color error data of the predetermined color is $\Delta H$; and hue data in picked-up color data of the predetermined color is $H_1$, then the operation of subtraction section 105 shown in FIG. 4 is shown by $\Delta H = H_{r1} - H_1$, so that $H_1 = H_{r1} - \Delta H$. CPU 61 forms hue data $H_1$ in picked-up color data on the basis of hue data $H_{r1}$ in reference color data and hue difference data $\Delta H$ in color error data by using this equation. Similar processings are also performed with respect to luminance level and saturation data in picked-up color data. If color error data is data corresponding to differences between Y, R-Y, and B-Y signals or R, G, and B signals, then CPU 61 converts it into data designating differences in luminance level, hue and saturation and uses the data after the conversion.

Next, CPU 61 sets a plurality of areas by dividing the color solid space in correspondence with a plurality of predetermined colors by referring to reference color data held by CPU 61 (step S103). CPU 61 then makes a determination as to whether reference color data and picked-up color data of each of the predetermined colors exist together in one area (step S104). If there is a pair of groups of color data which do not exist together in one area (N), the desired color data is selected (step S105). That is, some of the pairs of groups of color data corresponding to the plurality of designated colors is discarded so that each of the rest of the pairs of groups of color data can exist together in one area. This selection may be performed on user's judgement or may be automatically performed by CPU 61. After the completion of color data selection, the process returns to step S103. If any one of the pairs of groups of color data exist together in one area (Step S104; Y), the setting data calculation section 64 calculates setting data with respect to each area on the basis of the reference color data and the picked-up color data (step S106). Next, the setting data output section 65 outputs setting data 53 from CPU 61 to CCU 30 (step S107), thus completing the operation. Setting data 53 sent to CCU 30 is input to the color matching circuit 45 by the setting data input section 54 to be stored in the color matching circuit 45. Details of the area setting method and the contents of setting data are as described below.

The operation of CCU 30 in normal use after the completion of color matching by the above-described operation will next be described. Modulated video signal 31 sent from the CHU of video camera 10 is demodulated by receiving section 32 of CCU 30 and is input to color matching processing section 33. In color matching processing section 33, R-Y, and B-Y signals output from switch circuit 43 are converted into saturation signal S and hue signal H by coordinate conversion circuit 44, and saturation signal S and hue signal H output from coordinate conversion circuit 44 and Y signal output from switch circuit 43 are input to color matching circuit 45. In color matching circuit 45, setting data input section 54 inputs and stores setting data 53 sent from CPU 61. In color matching circuit 45, hue signal H is first corrected by hue correction section 55 in accordance with contents of calculation (contents of correction) determined on the basis of the setting data. Subsequently, saturation signal S is corrected by saturation correction section 56 in accordance with the contents of calculation determined on the basis of the setting data and information of a correction result obtained by hue correction section 55, and Y signal supplied is corrected by luminance level correction section 57 in accordance with the contents of calculation determined on the basis of the setting data and information of a correction result obtained by hue correction section 55. The operation after correction by color matching circuit 45 is as already described above. Details of the contents of calculations performed by hue correction section 55, saturation correction section 56 and luminance level correction section 57 in color matching circuit 45 are as described below.

The contents of calculations performed by hue correction section 55, saturation correction section 56 and luminance level correction section 57 in color matching circuit 45, the area setting method, the contents of setting data, etc., will next be described in detail.

Figure 11:
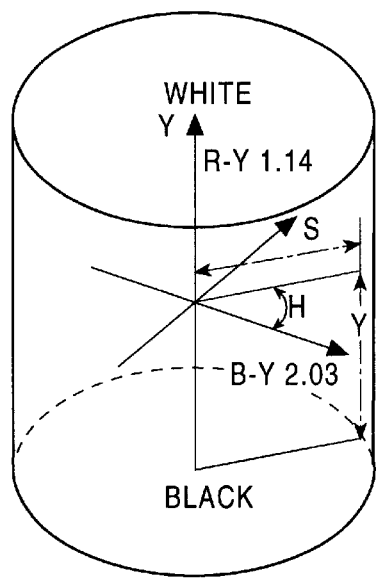
FIG. 11 is a diagram showing a color solid space in which a liminane level, a hue and a saturation are indicated by coordinates.

The relationship between Y, R-Y, and B-Y signals and the luminance level, hue and saturation will first be described. FIG. 11 shows a color solid space for indicating luminance levels, saturations and hues by coordinates. In this color solid space, the axis in the direction of height (hereinafter referred to as "Y-axis") designates lightness (luminance level) Y, the distance from the Y-axis in a plane perpendicular to the Y-axis designates S, and the rotational angle (phase) from a predetermined axis in the plane perpendicular to the Y-axis designates hue H. In the plane perpendicular to the Y-axis, the hue H 0° axis is B-Y/2.03 axis (hereinafter referred to as "B-Y axis"), and the axis perpendicular to the B-Y axis is R-Y/1.14 axis (hereinafter referred to as "R-Y axis").

Figure 12:
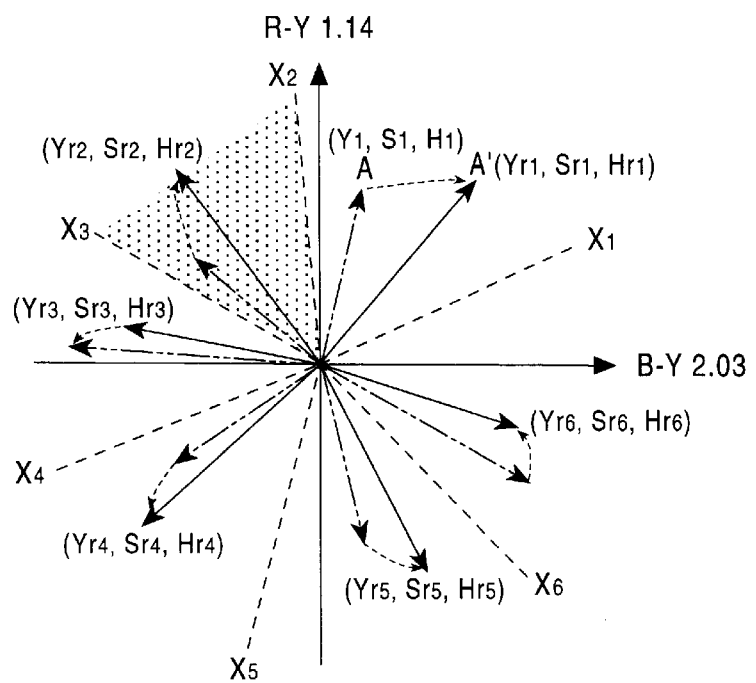
FIG. 12 is a diagram for explaining an area setting method in the first embodiment of the present invention.
Figure 13:
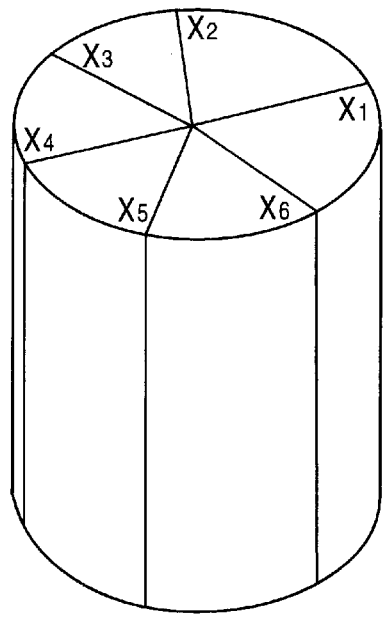
FIG. 13 is a diagram for explaining the area setting method in the first embodiment of the present invention.

The area setting method will next be described. It is assumed here that color matching is performed with respect to six picked-up colors, that, as shown in FIG. 12, the combinations of (luminance level, saturation, hue) of the six colors in accordance with reference color data are ($Y_{r1}$, $S_{r1}$, $H_{r1}$), ($Y_{r2}$, $S_{r2}$, $H_{r2}$), ($Y_{r3}$, $S_{r3}$, $H_{r3}$), ($Y_{r4}$, $S_{r4}$, $H_{r4}$), ($Y_{r5}$, $S_{r5}$, $H_{r5}$), and ($Y_{r6}$, $S_{r6}$, $H_{r6}$) while the combinations of (luminance level, saturation, hue) of the six colors in accordance with picked-up color data are ($Y_1$, $S_1$, $H_1$), ($Y_2$, $S_2$, $H_2$), ($Y_3$, $S_3$, $H_3$), ($Y_4$, $S_4$, $H_4$), ($Y_5$, $S_5$, $H_5$), and ($Y_6$, $S_6$, $H_6$), and that color matching is performed so that ($Y_n$, $S_n$, $H_n$) is matched to ($Y_{rn}$, $S_{rn}$, $H_{rn}$) (n=1, 2, . . . , 6).

Area setting is performed by using ($Y_{r1}$, $S_{r1}$, $H_{r1}$) to ($Y_{r6}$, $S_{r6}$, $H_{r6}$). As shown in FIG. 12, an area boundary line is set at the middle position between each adjacent pair of hue data items $H_{r1}$ to $H_{r6}$ of the six colors in the reference color data. For example, between ($Y_{r1}$, $S_{r1}$, $H_{r1}$) and ($Y_{r2}$, $S_{r2}$, $H_{r2}$), an area boundary line $X_2$ is set at the middle position ($H_{r1}$+$H_{r2}$)/2 between hue data items $H_{r1}$ and $H_{r2}$. Six area boundary lines $X_1$ to $X_6$ are set in this manner, and one area is defined between each adjacent pair of the boundary lines, thus setting a total of six areas. In FIG. 12, areas are shown on a plane perpendicular to the Y-axis. However, actual areas in the color solid space are three-dimensional regions which are defined between boundary surfaces formed by moving boundary lines X1 to X6 in the vertical direction.

In this embodiment, calculation processing is performed for color matching within each area divided in the above-described manner. Accordingly, a necessary condition is that hue data $H_n$ in picked-up color data falls into the same area as hue data $H_{rn}$ in reference color data. Since the same calculation processing is performed with respect to the areas, the contents of calculations of hue, saturation and luminance level will be described in order below with respect to the area between $X_1$ and $X_2$ by way of example.

Figure 14:
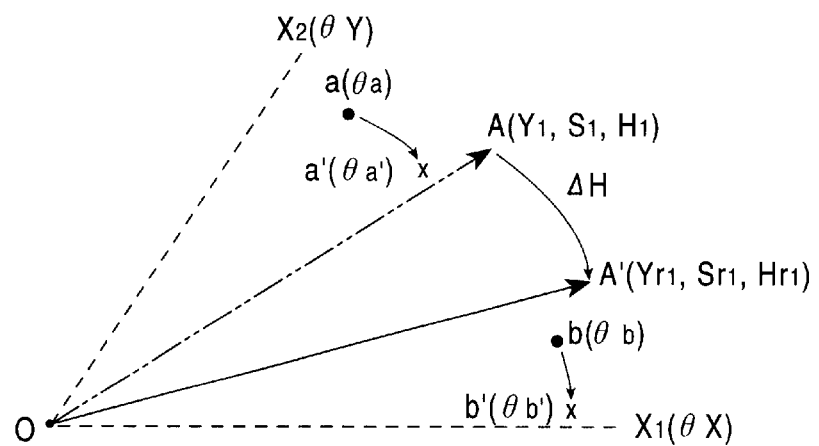
FIG. 14 is a diagram for explaining the contents of calculation of hue in the first embodiment of the present invention.

The contents of calculation of hue will first be described with reference to FIG. 14. FIG. 14 shows the area between $X_1$ and $X_2$. In FIG. 14, O designates the point of intersection of boundary lines $X_1$ and $X_2$, and the area between $X_1$ and $X_2$ is expressed as area $\angle X_1 O X_2$. Also, θX represents the value of the hue at boundary line $X_1$, and θY represents the value of the hue at boundary line $X_2$. In area $\angle X_1 O X_2$, a point $A(Y_1, S_1, H_1)$ designates (luminance level, saturation, hue) in picked-up color data, and a point $A'(Y_{r1}, S_{r1}, H_{r1})$ designates (luminance level, saturation, hue) in reference color data. A point a designates (luminance level, saturation, hue) obtained in the region between boundary line $X_2$ and the line AO by image pickup in video camera 10 in normal use, and a point b designates (luminance level, saturation, hue) obtained in the region between boundary line $X_1$ and the line AO by image pickup in video camera 10. A point a' designates the hue after correction (hereinafter referred to as "phase shift") of the hue at the point a, and a point b' designates the hue after a phase shift from the hue at the point b. $\theta_a$, $\theta_b$, $\theta_a'$, and $\theta_b'$ respectively represent the values of hues at the points a, b, a'. and b' (phases from the B-Y axis).

In this embodiment, regardless of whether $H_1 \geq H_{r1}$ or $H_1 < H_{r1}$, the values $\theta_a'$ and $\theta_b'$ after a phase shift can be calculated as shown by the following equations:

$$\theta_a' = \theta Y - (\theta Y - \theta_a) \times (\theta Y - H_{r1})/(\theta Y - H_1)$$

$$\theta_b' = \theta X + (\theta_b - \theta X) \times (H_{r1} - \theta X)/(H_1 - \theta X) \quad (1)$$

Equations (1) represent the contents of calculation of hue, and hue correction section 55 shown in FIG. 7 performs this calculation. Data other than variables $\theta_a$ and $\theta_b$ in the right-side expressions of equations (1) are given as setting data 53 from CPU 61.

Figure 15A:
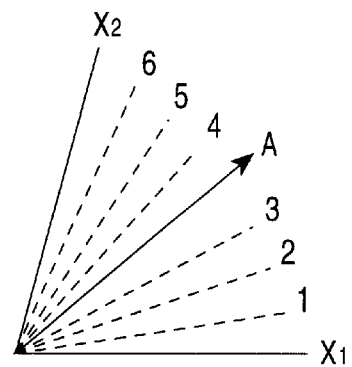
FIGS. 15A and 15B are diagrams for explaining the contents of calculation of hue in the first embodiment of the present invention.
Figure 15B:
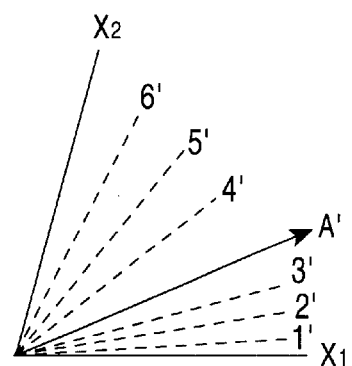

FIGS. 15A and 15B schematically show hues before a phase shift (indicated by reference numerals 1 to 6 in FIG. 15A) and hues after the phase shift (indicated by reference numerals 1' to 6' in FIG. 15B). As can be understood from FIGS. 15A and 15B, for correction of a hue in this embodiment, calculation processing is performed so that the ratio of the difference between a hue before a phase shift and the hue of a boundary line and the difference between the hue after the phase shift and the hue of the boundary line is equal to the ratio of the difference between the hue of the point A and the hue of the boundary line and the difference between the hue of the point A' and the hue of the boundary line.

Figure 16:
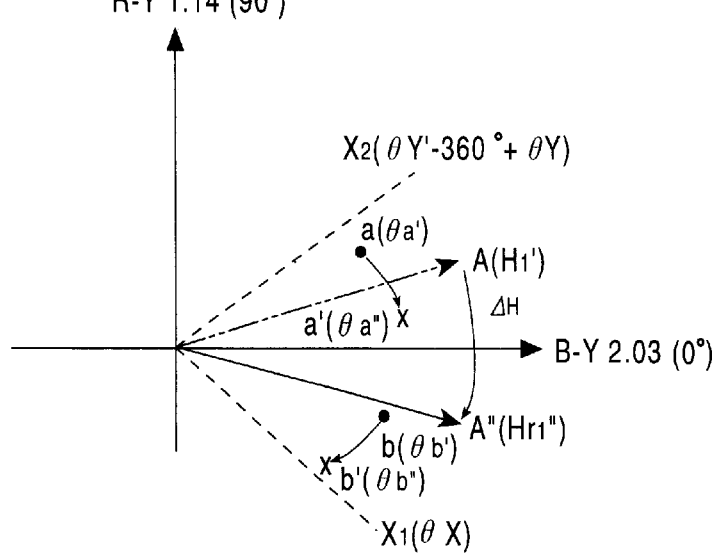
FIG. 16 is a diagram for explaining the contents of calculation of hue in the first embodiment of the present invention in the case where one area extends on the opposite sides of the B-Y axis.

While the contents of basic calculation of hue are as described above, calculations modified as described below are required if, as shown in FIG. 16, one area extends on the opposite sides of the B-Y axis (if one area extends over adjacent portions of the first and fourth quadrants along the B-Y/R-Y plane).

(i) If A, A', a, and b exist in the first quadrant (R-Y/1.14>0 and B-Y/2.03>0), then $H_1^*$, $H_{r1}^*$, $\theta_a^*$, and $\theta_b^*$ defined as shown below are used.

$$H_1^* = 360° + H_1$$

$$H_{r1}^* = 360° + H_{r1}$$

$$\theta_a^* = 360° + \theta_a$$

$$\theta_b^* = 360° + \theta_b$$

(ii) If A, A', a, and b exist in the fourth quadrant (R-Y/1.14<0 and B-Y/2.03>0), then $H_1^*$, $H_{r1}^*$, $\theta_a^*$, and $\theta_b^*$ defined as shown below are used.

$$H_1^* = H_1$$

$$H_{r1}^* = H_{r1}$$

$$\theta_a^* = \theta_a$$

$$\theta_b^* = \theta_b$$

In either of the cases (i) and (ii), θY* defined as shown below is used.

$$\theta Y^* = 360° + \theta Y$$

If one area extends on the opposite sides of the B-Y axis, the hue values $\theta_a'$ and $\theta_b'$ after a phase shift x can be obtained by using the values defined as shown above and by equations (2) shown below regardless of whether $H_1 \geq H_{r1}$ or $H_1 < H_{r1}$. Equations (2) are formed by modifying equations (1). In the following equations (2), each of θX, θY, $H_1$, $H_{r1}$, $\theta_a$, $\theta_b$, $\theta_a'$, and $\theta_b'$ is a counterclockwise phase from the B-Y axis.

$$\theta_a' = \theta Y^* - (\theta Y^* - \theta_a^*) \times (\theta Y^* - H_{r1}^*)/(\theta Y^* - H_1^*)$$

$$\theta_b' = \theta X + (\theta_b^* - \theta X) \times (H_{r1}^* - \theta X)/(H_1^* - \theta X) \quad (2)$$

If $\theta_a'^*$ and $\theta_b'^*$ obtained by equations (2) exist in the first quadrant, then $\theta_a'$ and $\theta_b'$ are obtained by the following equations:

$$\theta_a' = \theta_a'^* - 360°$$

$$\theta_b' = \theta_b'^* - 360°$$

If $\theta_a'^*$ and $\theta_b'^*$ obtained by equations (2) exist in the fourth quadrant, then $\theta_a'$ and $\theta_b'$ are obtained by the following equations:

$$\theta_a' = \theta_a'^*$$

$$\theta_b' = \theta_b'^*$$

Figure 17:
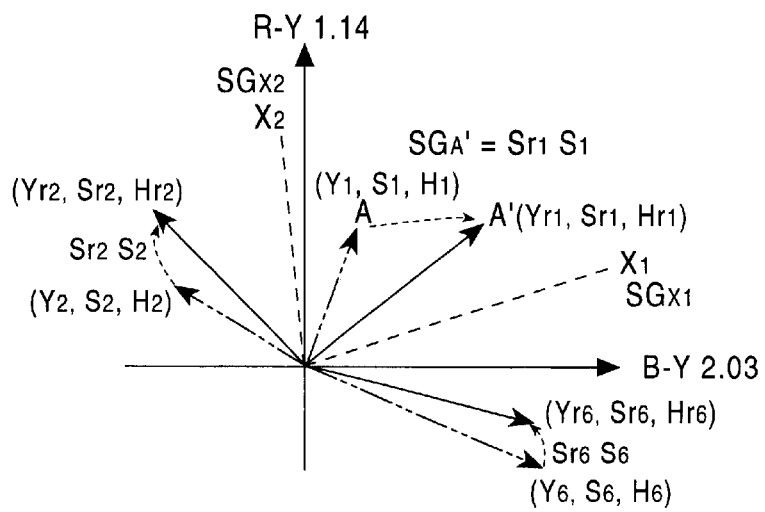
FIG. 17 is a diagram for explaining the contents of calculation of saturation in the first embodiment of the present invention.

The contents of calculation of saturation will next be described with reference to FIG. 17. FIG. 17 shows the area between $X_1$ and $X_2$ and areas adjacent thereto. As shown in FIG. 17, for matching of saturation level $S_1$ at point $A(Y_1, S_1, H_1)$ obtained by image pickup in video camera 10 to saturation level $S_{r1}$ at point $A'(Y_{r1}, S_{r1}, H_{r1})$ in accordance with reference color data, $S_1$ may be multiplied by $S_{r1}/S_1$. The ratio of a target saturation level to a saturation level changed to be matched to the target saturation level, represented by $S_{r1}/S_1$, will be referred to as "gain" in saturation. The gain varies with respect to hues. The gain at $H_{r1}$ is $S_{r1}/S_1$. This means that, if the hue after a phase shift is $H_{r1}$, the saturation level changed to be matched can be matched to the saturation level in accordance with reference color data by being multiplied by $S_{r1}/S_1$. Similarly, the gain at $H_{r2}$ shown in FIG. 17 is $S_{r2}/S_2$, and the gain at $H_{r6}$ is $S_{r6}/S_6$. The gain at each of the area boundary lines ($X_1$ to $X_6$) is set to the average of the gains determined in the areas on the opposite sides of the boundary line. That is, for example, if the gain at $X_1$ is $SG_{X1}$, $SG_{X1}$ can be obtained as shown by the following equation:

$$SG_{X1}=(S_{r1}/S_1+S_{r2}/S_2)/2$$

Thus, the gains at the hues in accordance with reference color data and the gains at the area boundary lines are obtained on the basis of reference color data and picked-up color data. In normal use of the apparatus, the gain with respect to a hue obtained by image pickup in video camera 10 is calculated by using the gain at the corresponding hue in accordance with reference color data and the gain at the corresponding area boundary line. An example of this calculation will be described with reference to FIG. 18.

Figure 18:
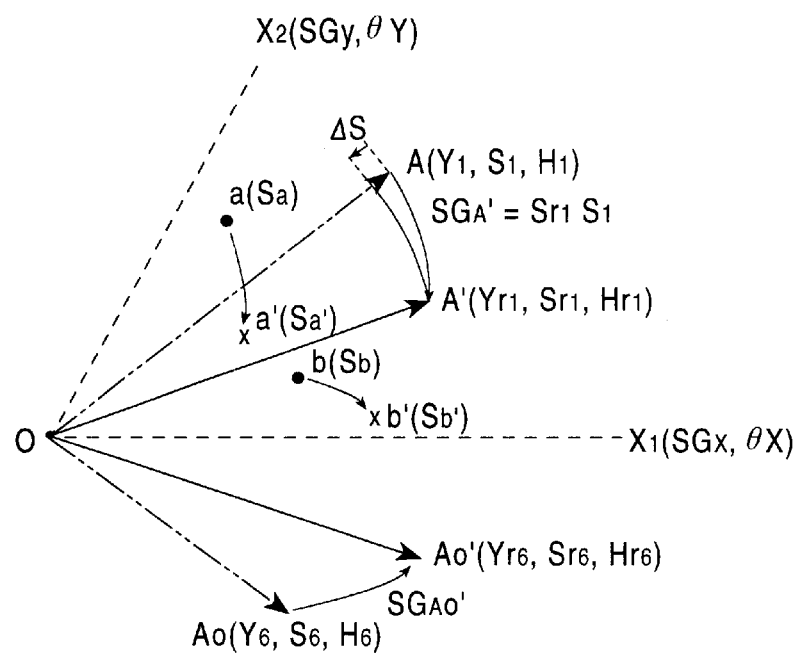
FIG. 18 is a diagram for explaining the contents of calculation of hue in the first embodiment of the present invention.

FIG. 18 shows the area between $X_1$ and $X_2$ and an area adjacent thereto. In FIG. 18, $\theta X$ represents the value of the hue at boundary line $X_1$ and $\theta Y$ represents the value of the hue at boundary line $X_2$, as in the description of the hue calculation contents. $SG_A'=S_{r1}/S_1$ represents the gain at point $A'(Y_{1r}, S_{1r}, H_{1r})$ in accordance with reference color data in area $\angle X_1OX_2$, $SG_X$ represents the gain at boundary line $X_1$, and $SG_Y$ represents the gain at boundary line $X_2$. In FIG. 18, the gain at point $A_0'(Y_{r6}, S_{r6}, H_{r6})$ in accordance with reference color data in the adjacent area are shown as $SG_{AO}'(=S_{r6}/S_6)$. In this case, the gain at boundary line $X_1$ is $SG_X=(SG_A'+SG_{AO}')/2$. In FIG. 18, $\Delta S$ represents data of the difference between saturations in error data, and $\Delta S=S_{r1}-S_1$. Therefore, saturation data $S_1$ in picked-up color data can be obtained by $S_1=S_{1r}-\Delta S$.

A point a designates (luminance level, saturation, hue) obtained in the region between boundary line $X_2$ and the line AO by image pickup in video camera 10 in normal use, and a point b designates (luminance level, saturation, hue) obtained in the region between boundary line $X_1$ and the line AO by image pickup in video camera 10. A point a' designates the hue after a phase shift (hue correction) from the point a, and a point b' designates the hue after a phase shift and saturation correction from the point b. $S_a$, $S_b$, $S_a'$, and $S_b'$ respectively represent the values of the saturations at points a, b, a', and b'. $\theta_a'$ and $\theta_b'$ respectively represent the values of hues after phase shifts from the points a and b.

In this embodiment, regardless of whether $H_1 \geq H_{r1}$ or $H_1 < H_{r1}$, the values of saturations $S_a'$ and $S_b'$ after correction can be calculated as shown by the following equations (3):

$$S_a'=\{SG_Y-(SG_Y-SG_A')\times(\theta Y-\theta_a')/(\theta Y-H_{r1})\}\times S_a$$

$$S_b'=\{SG_X-(SG_X-SG_A')\times(\theta_b'-\theta X)/(H_{r1}-\theta X)\}\times S_b \quad (3)$$

Equations (3) represent the contents of calculation of saturation. In this calculation, the gain at an arbitrary hue between the hues in accordance with reference color data and the hues at the boundary lines is determined based on the gain at the corresponding hue in accordance with reference color data and the gain at the corresponding area boundary line so as to be change linearly with respect to hue. The calculation shown by equations (3) is performed by saturation correction section 56 shown in FIG. 7. The values $\theta_a'$ and $\theta_b'$ in the right-side expressions of equations (3) are given as information of the results of correction performed by hue correction section 55, i.e., the results of the calculations shown by equations (1) or (2). Data items other than variables $S_a$ and $S_b$ and $\theta_a'$ and $\theta_b'$ in the right-side expressions of equations (3) are given as setting data 53 from CPU 61.

While the contents of basic calculation of saturation are as described above, modified calculations such as those shown by equations (4) below are required if one area extends on the opposite sides of the B-Y axis, as in the case of the calculation of hue. The definitions of $H_1^*$, $H_{r1}^*$, $\theta_a^*$, $\theta_b^*$, and $\theta Y^*$ are the same as those in the case of the calculation of hue. The values $\theta_a'^*$ and $\theta_b'^*$ are obtained by $$S_a'=\{SG_Y-(SG_Y-SG_A')\times(\theta Y^*-\theta_a'^*)/(\theta Y^*-H_{r1}^*)\}\times S_a$$

$$S_b'=\{SG_X-(SG_X-SG_A')\times(\theta_b'^*-\theta X)/(H_{r1}^*-\theta X)\}\times S^b \quad (4)$$

The contents of calculation of luminance level are similar to the contents of calculation of saturation, and are obtained by replacing the values of saturation in the description of the calculation of saturation with the values of luminance level. However, with respect to a signal of saturation level zero, i.e., a signal on the Y-axis, the unchanged value is output since it is a black-and-white signal and has no chromatic value. The calculation of luminance level is performed by luminance level correction section 57 shown in FIG. 7.

The contents of setting data will next be described. CPU 61 calculates data other than the variables in the equations (1) to (4) shown above and $\theta_a'$ and $\theta_b'$ obtained by information of the results of correction by the hue correction section 55, and supplies the calculated data as setting data to CCU 30.

More specifically, setting data 53 includes the following five kinds of data:
(1) the values of hues at area boundary lines ($X_1$ to $X_6$)
(2) hues ($H_1$ to $H_6$) in accordance with picked-up color data
(3) hues ($H_{r1}$ to $H_{r6}$) in accordance with reference color data
(4) gains in saturation ($SG_{X1}$ to $SG_{X6}$, $SG_A'$, and so on)
(5) gains in luminance level (same as gains in saturation)

Figure 19A:
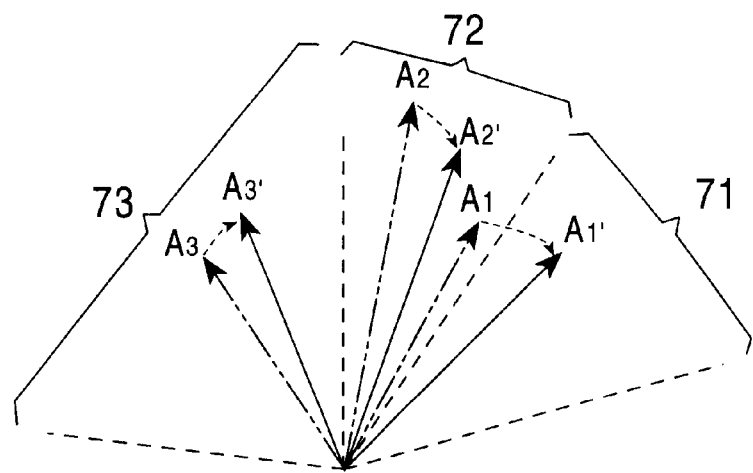
FIGS. 19A and 19B are diagrams for explaining selection of color data in the first embodiment of the present invention.
Figure 19B:
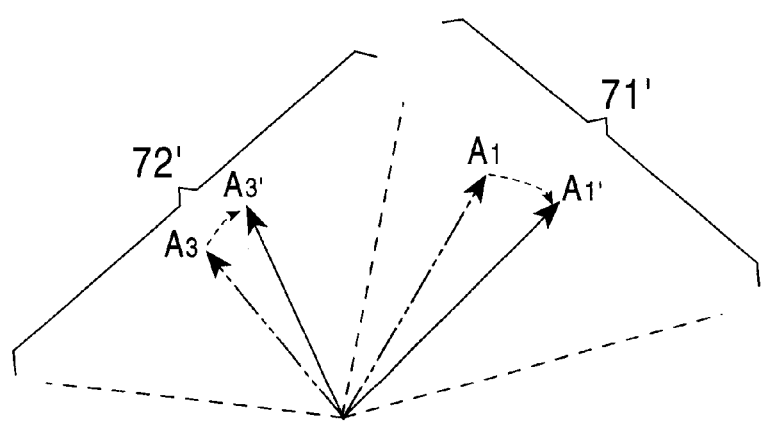

Selection of color data performed if reference color data and picked-up color data do not exist together in one area (step S105 in FIG. 10) will finally be described with reference to FIGS. 19A and 19B. FIG. 19A shows an example of a case where a pair of groups of color data do not exist together in one area. Referring to FIG. 19A, areas 71 to 73 are defined, points $A_1'$ to $A_3'$ deisgnate reference color data (luminance level, saturation, hue) in areas 71 to 73, and points $A_1$ to $A_3$ desingate picked-up color data (luminance level, saturation, hue) corresponding to $A_1'$ to $A_3'$. In this example, point $A_1'$ and point $A_1$ are not both in the area 71; point $A_1$ is in area 72. In such a case, one of the pair $A_1$, $A_1'$ and the pair $A_2$, $A_2'$ may be discarded and areas may be newly set. FIG. 19B shows a case where the pair $A_2$, $A_2'$ is discarded and areas 71' and 72' are newly set. Such a color data selection may be determined and made by a user or may be automatically determined and made by CPU 61. For example, in the case of selection under user's judgement, the arrangement may be such that, if there is a pair of groups of color data not existing together in one area, CPU 61 displays information on this state on a monitor, and displays, for example, an image such that shown in FIG. 19A to enable a user to select color data by operating a user interface while observing the monitor. Then the user can select and leave, on his or her judgement, suitable color data, e.g., a pair of groups of data for a flesh color. If CPU 61 automatically determines and makes a selection of color data, it may select color data in such a manner that, of pairs of groups of color data at least one of which may be discarded to obtain a result that any one of the pairs of groups of color data will exist together in one area, a pair having a larger difference between the constituent items is left.

As described above, in this embodiment of the present invention, reference color signal generation section 101 which generates information used as a reference for predetermined colors is provided in CCU 30 corresponding to each video camera 10. Therefore, there is no need for a special reference camera or for holding color data obtained by forming an image with a reference camera, and it is possible to perform color matching between a plurality of video cameras 10. For example, if only image pickup conditions of a plurality of cameras 10 coincide with each other, color matching between the plurality of cameras 10 can be performed any time and anywhere.

In this embodiment, a plurality of colors such as those of a color chart are picked up simultaneously with video camera 10 to form information (color error data 52) used to determine the contents of correction in color matching circuit 45, thereby simplifying the process of color matching in comparison with the case of performing the image pickup operation with respect to each color, and making it easier to perform color matching with respect to a plurality of colors.

Also in this embodiment, by using subtraction circuit 105 and detection circuit 107, color error data 52 corresponding to the difference between a reference color signal and a signal obtained by forming a predetermined color with video camera 10 is formed as information for determining the contents of correction in color matching circuit 45, thereby making it possible to reduce the amount of information used for determining the contents of correction as well as to reduce the circuit scale. Specifically, the circuit scale of integrators constituting detection circuit 107 (the number of LSI gates) can be reduced.

Also in this embodiment, a color solid space is divided into a plurality of areas and color data is corrected in accordance with the contents of calculations determined with respect to each area, thereby enabling optimum color matching with resect to each area. The embodiment has been described by assuming that the number of matching colors, i.e., the number of areas, is six. However, the number of matching colors or the number of areas is not limited as long as reference color data and picked-up color data of each color exist together in the same area. Thus, the color correcting apparatus and the color correction control apparatus of this embodiment enable color matching between cameras with respect to a multiplicity of colors.

Figure 20:
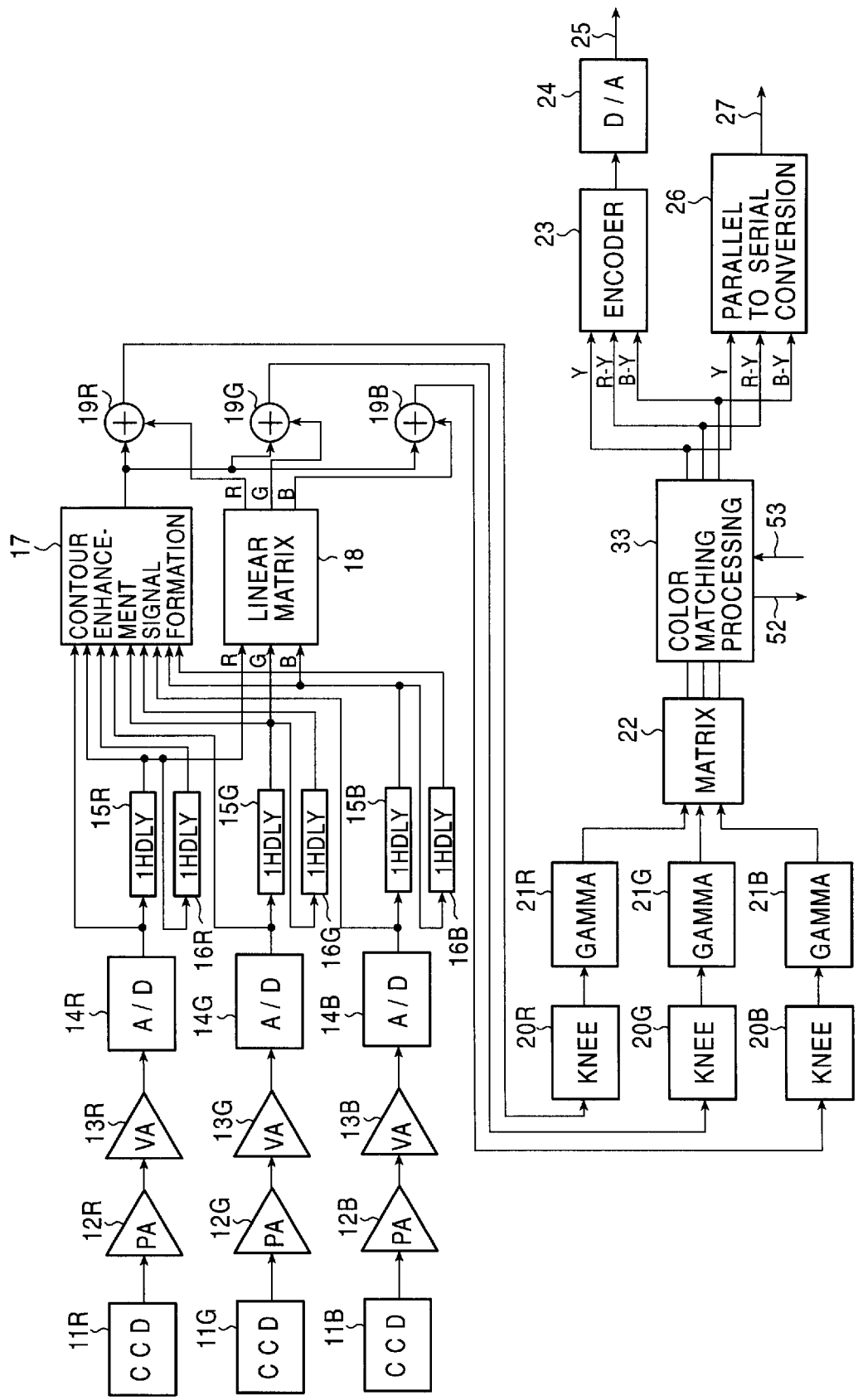
FIG. 20 is a block diagram showing the configuration of a camera head unit for a video camera which includes a color correcting apparatus which represents a second embodiment of the present invention.

FIG. 20 is a block diagram showing the configuration of a CHU of a video camera including a color correcting apparatus, which represents a second embodiment of the present invention. In this embodiment, color matching processing section 33 is provided not in the CCU but in the CHU of video camera 10. As shown in FIG. 20, color matching processing section 33 is provided in a stage following matrix circuit 22 in the CHU. The configuration of the CCU in this embodiment is such that color matching processing section 33 is removed from the arrangement shown in FIG. 1. In other respects, the configuration, operation and advantages of this embodiment are the same as those of the first embodiment.

The present invention is not limited to the above-described embodiments. For example, color correction may be performed with a linear matrix circuit. A color matching method using a linear matrix circuit will be described briefly. With a linear matrix circuit, a matrix calculation shown by the following equations, for example, is performed.

$$R_O = R_i + a \times (R_i - G_i) + b \times (R_i - B_i)$$
$$G_O = G_i + c \times (G_i - R_i) + d \times (G_i - B_i)$$
$$B_O = B_i + e \times (B_i - R_i) + f \times (B_i - G_i) \quad (5)$$

In equations (5), $R_i$, $G_i$, and $B_i$ are values of red, green, and blue signals input to the linear matrix circuit, and $R_O$, $G_O$, and $B_O$ are values of red, green, and blue signals output from the linear matrix circuit. In color matching using a linear matrix circuit, coefficients a to f are determined so that color errors between cameras are minimized.

If the present invention is applied to color matching using a linear matrix circuit, levels of red, green, and blue signals are previously stored as reference data by the CCU, for example. Color matching is performed as described below. That is, an image of a color chart is formed with a camera, and the levels of red, green, and blue signals thereby obtained are detected. These levels are substituted for $R_i$, $G_i$, and $B_i$ in equations (5), reference data corresponding to same colors is substituted for $R_O$, $G_O$, and $B_O$ in equations (5), and coefficients a to f are calculated by the method of least squares. In normal use of the system, correction is performed by using equations (5) in which the obtained coefficients a to f are substituted.

As described above, the color correcting apparatus of the present invention is arranged so that a reference color information generator generates information used as a reference for a predetermined color, and a signal obtained by forming an image by the image pickup operation having the predetermined color is corrected in accordance with the contents of correction determined on the basis of the information formed with the reference color information generator and the signal obtained by the image pickup operation so as to match the color of the corrected signal to the color in accordance with the reference, thereby making it possible to easily perform color matching between a plurality of image pickup apparatuses by operating each apparatus without requiring a reference image pickup apparatus.

Also in the color correcting apparatus of the present invention, information for determination of correction contents is formed on the basis of formation generated by the reference color information generator and used as a reference for a plurality of predetermined colors and on the basis of a signal obtained by simultaneously picking up the predetermined colors, thus improving the facility with which color matching is performed with respect to a plurality of colors.

Also in the color correcting apparatus of the present invention, information corresponding to the difference between a reference color signal provided as information generated by the reference color information generator and a signal obtained by picking up predetermined colors is formed as information used for determining correction contents, thereby achieving a further reduction in circuit scale.

In the color correction control apparatus of the present invention, the contents of correction on the image pickup apparatus side are determined based on information generated by the reference color signal generator provided on the image pickup apparatus side and a signal obtained by picking up predetermined colors, thereby making it possible to easily perform color matching between a plurality of image pickup apparatuses by operating each apparatus without requiring reference image pickup apparatus.

What is claimed is:

1. An image pickup apparatus comprising:

color image pickup means for obtaining a color image pickup signal by converting light from an object into an electrical signal;

adjustment means for performing white and black level adjustment and contour enhancement of said color image pickup signal to generate an adjusted color image pickup signal;

reference color signal forming means for forming a reference color signal for the color image pickup signal, said reference color signal forming means being provided in said image pickup apparatus;

error signal output means for detecting a difference between the adjusted color image pickup signal and the reference color signal, and for outputting the difference as an error signal;

color correction information forming means for forming color correction information on the basis of the error signal; and color correction means for correcting a color of the adjusted color image pickup signal based on the color correction information.

2. An image pickup apparatus according to claim 1, wherein said error signal output means detects a color difference between the reference color signal and a color image pickup signal obtained by forming an image of a particular color chart by said color image pickup means, and outputs the difference as the error signal.

3. An image pickup apparatus according to claim 1, wherein said reference color signal forming means forms a reference color signal for a plurality of colors.

4. An image pickup apparatus according to claim 3, wherein said reference color signal forming means forms a color bar signal as the reference color signal for a plurality of colors.

5. An image pickup apparatus according to claim 3, wherein said reference color signal forming means forms the entire reference color signal for a plurality of colors in a time period corresponding to one frame formed by the color image pickup signal.

6. An image pickup apparatus according to claim 5, wherein said error signal output means includes the same number of error signal detection sections as the number of the reference color signals for a plurality of colors, and selection means for selectively outputting each of the reference color signals to the corresponding one of said plurality of error signal detection sections by changing the reference color signals with respect to the corresponding colors.

7. An image pickup apparatus according to claim 1, wherein said image pickup means is provided in a video camera while said color correction means, said reference color signal forming means, and said error signal output means and said color correction information forming means are provided in a camera control unit provided separately from the video camera to control the video camera.

8. An image pickup apparatus according to claim 1 wherein said adjustment means further includes:

A/D conversion means for converting the color correction signal after white and black balance adjustment to output a digital signal;

contour enhancement means for performing said contour enhancement on the digital signal output from said A/D conversion means;

delay means for delaying the digital signal output from said A/D conversion means by one horizontal period;

linear matrix means for correcting a color reproduction error of said delayed digital signal; and, adding means for adding outputs of said linear matrix means and said contour enhancement means to form said adjusted color image pickup signal.

9. An image pickup apparatus according to claim 8, further comprising:

knee circuit means for compressing signal levels of high-luminance portions of signal outputs of said adding means;

gamma correction means for performing gamma correction of outputs of signals output from said knee circuit means; and matrix means for converting R, G and B signals output from said gamma correction means to Y, R-Y and B-Y signals which are output to said color correction means as said adjusted color image pickup signal.

10. An image pickup apparatus according to claim 1 wherein said color correction means includes color representation data generating means for generating color representation data of hue (H), luminance (Y) and saturation (S) representing colors of an image represented by the color image pickup signal; and said color correction means divides a color space in which the H, Y and S data is represented in coordinates, into a plurality of regions, and corrects the H, Y and S data generated by said color representation data generating means in each region with respect to H, Y and S data representing a single reference color defined for each respective region, in accordance with a procedure determined for each region of said color space, thereby adjusting each color represented by the color image pickup signal with respect to the reference color of the respective region within which the represented color falls.

11. An image pickup apparatus according to claim 10, wherein corrected hue is determined in accordance with the following expressions:

$$a'=Y-(Y-a)\times(Y-Hr1)/(Y-H1);$$

$$b'=X+(b-X)\times(Hr1-X)/(H1-X)$$

where,

Y is a hue value of a first boundary of the color space region within which the color representation data falls;

X is a hue value of an opposite boundary of said color space region;

a is a pre-shift hue value for a point, associated with the generated signal, on a first side of said color space region between a reference hue value and said first boundary;

a' is a shifted hue value for the point corresponding to hue value a;

b is a pre-shift hue value for a point, associated with the generated signal, on a second side of a color space region between said reference hue value and said opposite boundary;

b' is a shifted hue value for the point corresponding to hue value b;

Hr1 is said reference hue value; and

H1 is a hue value of said imaging apparatus for the same color corresponding to said reference hue value.

12. An image pickup apparatus according to claim 11 wherein said color correction means performs a different hue correction procedure if the region within which the color representation data falls extends across a B-Y axis of said color space.

13. An image pickup apparatus according to claim 10 wherein corrected saturation is determined in accordance with the following:

$$S_a'=\{SG_Y-(SG_Y-SG_A')\times(*Y-*_a')/(*Y-H_{r1})\}\times S_a$$

$$S_b'=\{SG_X(SG_X-SG_A')\times(*_b'-*X)/(H_{r1}-*X)\}\times S_b,$$

where,
- *X is a hue value of a first boundary line $X_1$ of the color space region within which the color representation data falls;
- *Y is a hue value of an opposite boundary line $X_2$ of said color space region;
- $SG_X$ is saturation gain on the boundary line $X_1$;
- $SG_Y$ is saturation gain on the boundary line $X_2$;
- $S_a$ is a pre-correction saturation value for a first point, "a", associated with the generated signal, on a first side of said color space region between a value A' of the reference color and the first boundary line $X_1$;
- $S_a'$ is a corrected saturation value associated with a point, a', which is shifted from the first point due to corrected saturation and hue shift;
- $S_b$ is a pre-correction saturation value for a second point, b, associated with the generated signal, on a second side of said color space region between the reference color value and the second boundary line $X_2$;
- $S_b'$ is a corrected saturation value associated with a point, b', which is shifted from the second point due to corrected saturation and hue shift;
- $*_a'$ is a shifted hue value associated with the point a';
- $*_b'$ is a shifted hue value associated with the point b';
- $SG_A'$ is a saturation gain associated with the reference color value A'; and
- $H_{r1}$ is a reference hue value associated with the reference color value A'.

14. A color correcting apparatus which corrects a color of a color image pickup signal formed by color image pickup means and adjusted via white and black level adjustment and contour enhancement, said apparatus comprising:

reference color signal forming means for forming a reference color signal for the color image pickup signal, said reference color signal forming means being provided in said color correcting apparatus;

error signal output means for detecting a difference between the adjusted color image pickup signal and the reference color signal, and for outputting the difference as an error signal;

color correction information forming means for forming color correction information on the basis of the error signal; and color correction means for correcting a color of the adjusted color image pickup signal based on the color correction information.

15. A color correcting apparatus according to claim 14, wherein said error signal output means detects a color difference between the reference color signal and a color image pickup signal obtained by forming an image of a particular color chart by the color image pickup means, and outputs the difference as the error signal.

16. A color correcting apparatus according to claim 14, wherein said reference color signal forming means forms a reference color signal for a plurality of colors.

17. A color correcting apparatus according to claim 16, wherein said reference color signal forming means forms a color bar signal as the reference color signal for a plurality of colors.

18. A color correcting apparatus according to claim 16, wherein said reference color signal forming means forms the entire reference color signal for a plurality of colors in a time period corresponding to one frame formed by the color image pickup signal.

19. A color correcting apparatus according to claim 18, wherein said error signal output means includes the same number of error signal detection sections as the number of the reference color signals for a plurality of colors, and selection means for selectively outputting each of the reference color signals to the corresponding one of said plurality of error signal detection sections by changing the reference color signals with respect to the corresponding colors.

20. A color correcting apparatus according to claim 14, wherein said color correction means, said reference color signal forming means, said error signal output means and said color correction information forming means are provided in a camera control unit provided separately from the video camera to control a video camera.

* * * * *